E. & W. H. TAYLOR.
APPARATUS FOR GENERATING AND UTILIZING MOTIVE FLUIDS.
APPLICATION FILED OCT. 9, 1911.
1,241,780.
Patented Oct. 2, 1917.
11 SHEETS—SHEET 2.
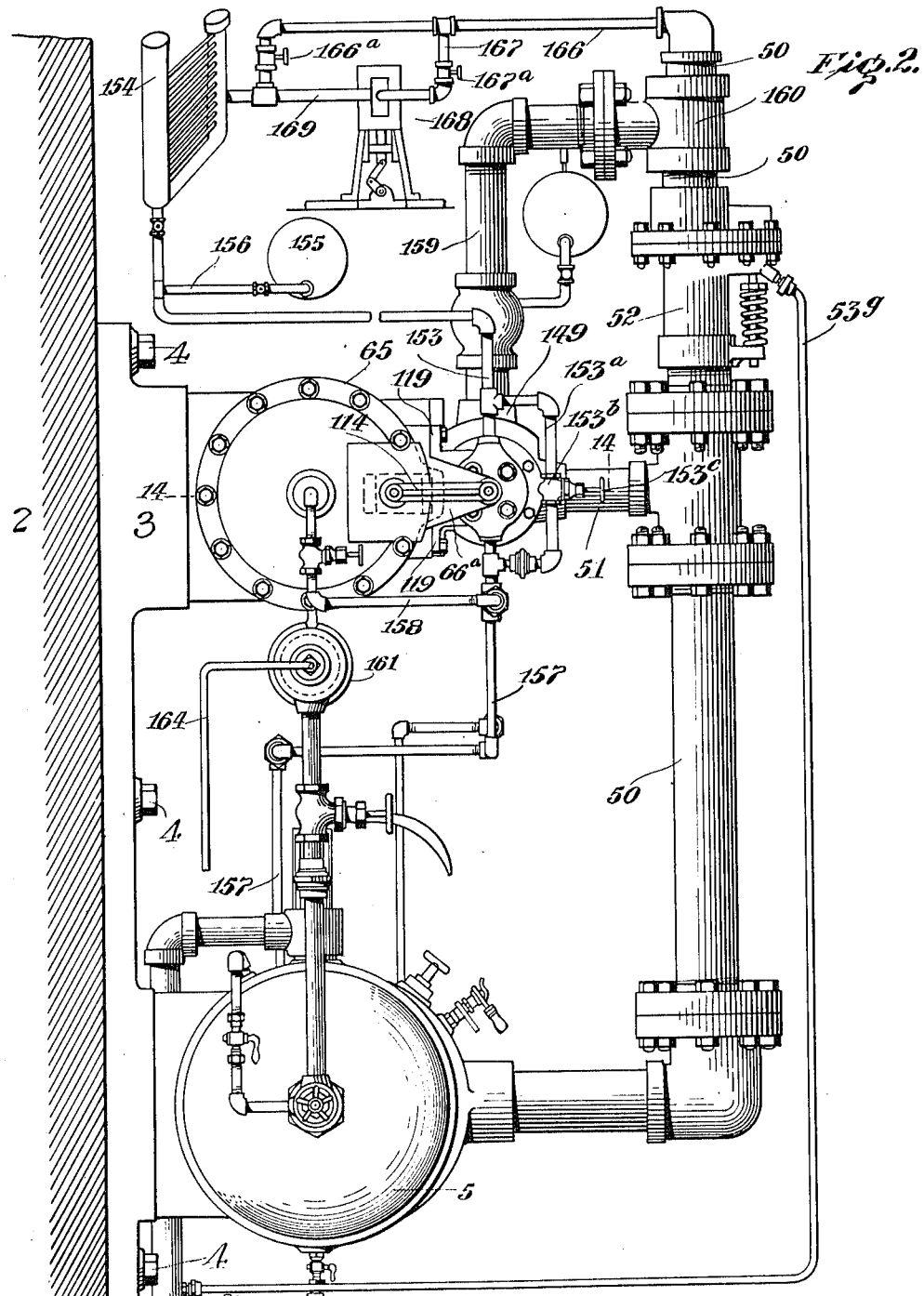

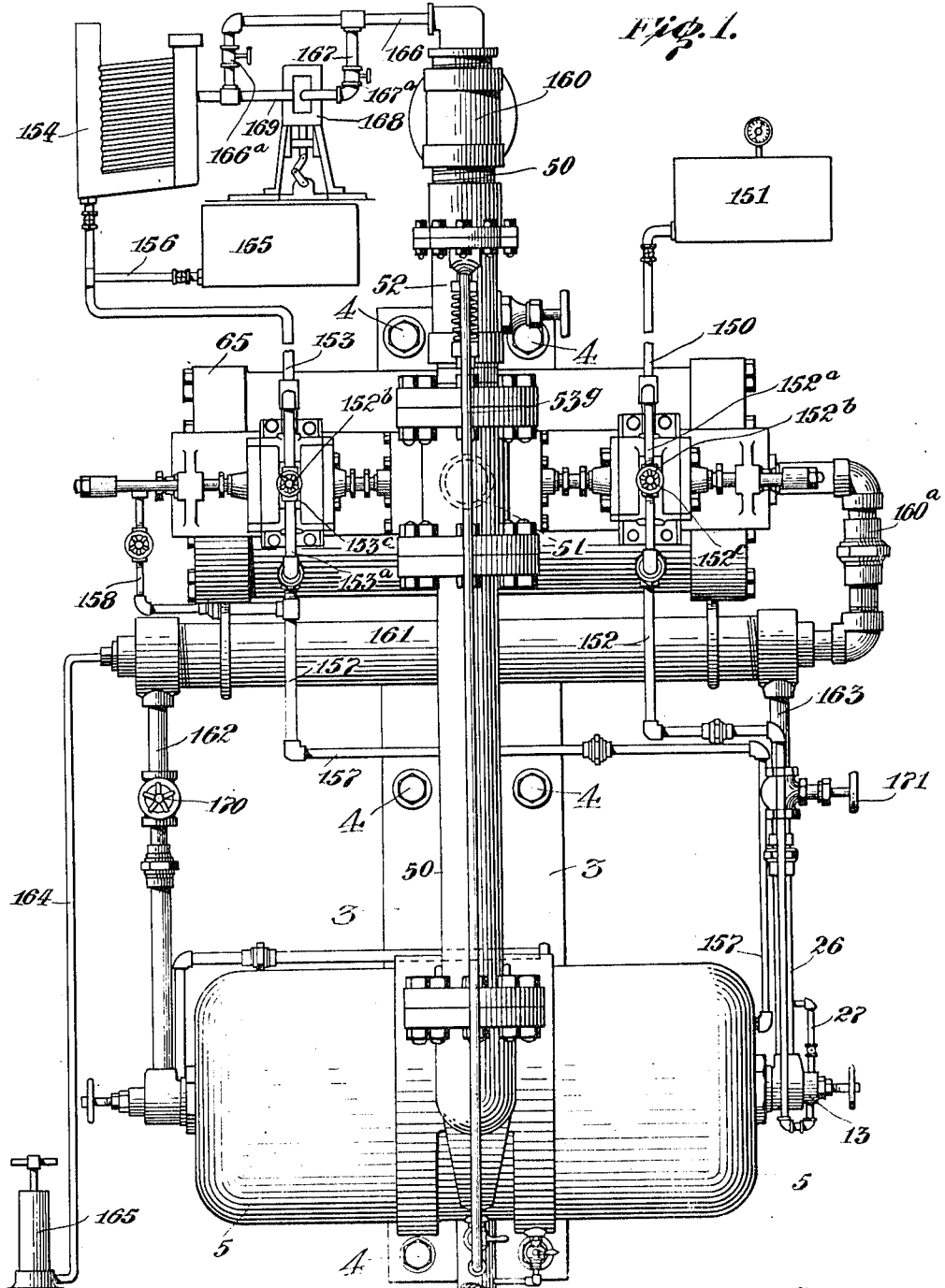

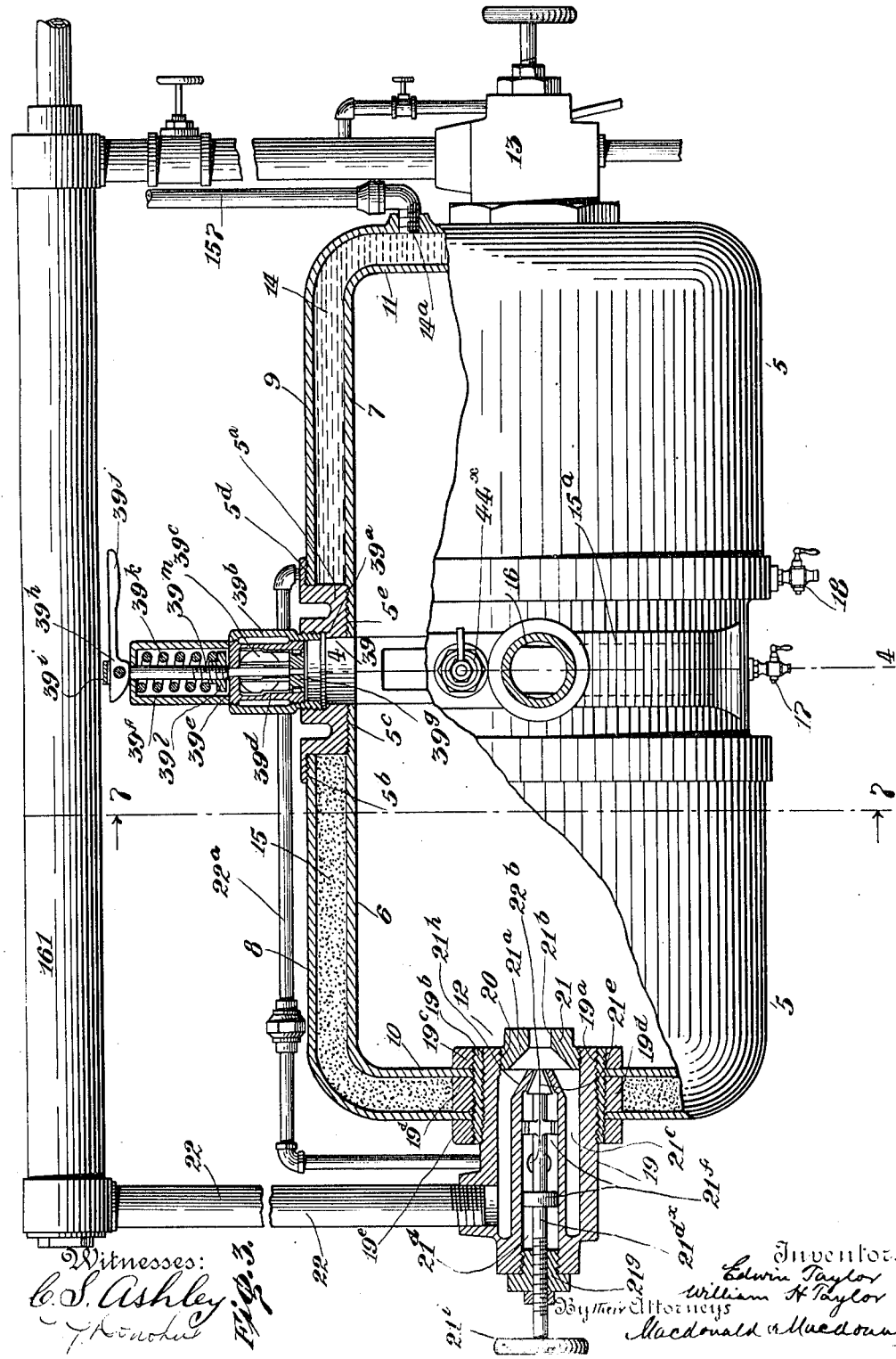

E. & W. H. TAYLOR.
APPARATUS FOR GENERATING AND UTILIZING MOTIVE FLUIDS.
APPLICATION FILED OCT. 9, 1911.
1,241,780.
Patented Oct. 2, 1917.
11 SHEETS—SHEET 4.
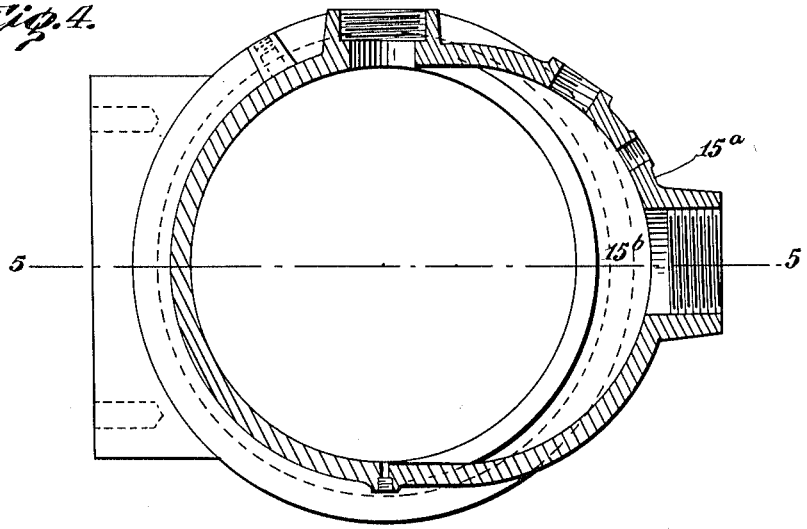
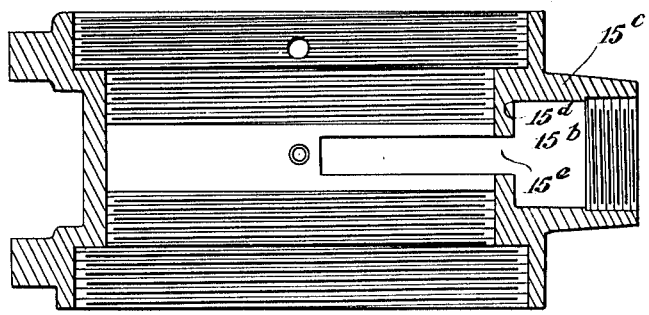
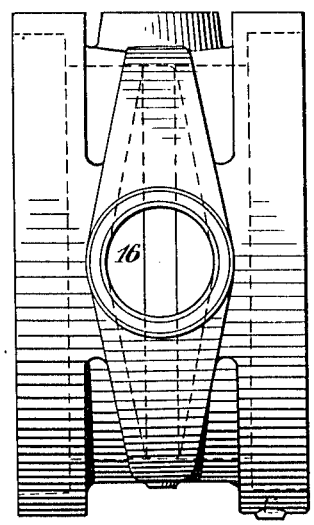

E. & W. H. TAYLOR.
APPARATUS FOR GENERATING AND UTILIZING MOTIVE FLUIDS.
APPLICATION FILED OCT. 9, 1911.
1,241,780.
Patented Oct. 2, 1917.
11 SHEETS—SHEET 5.
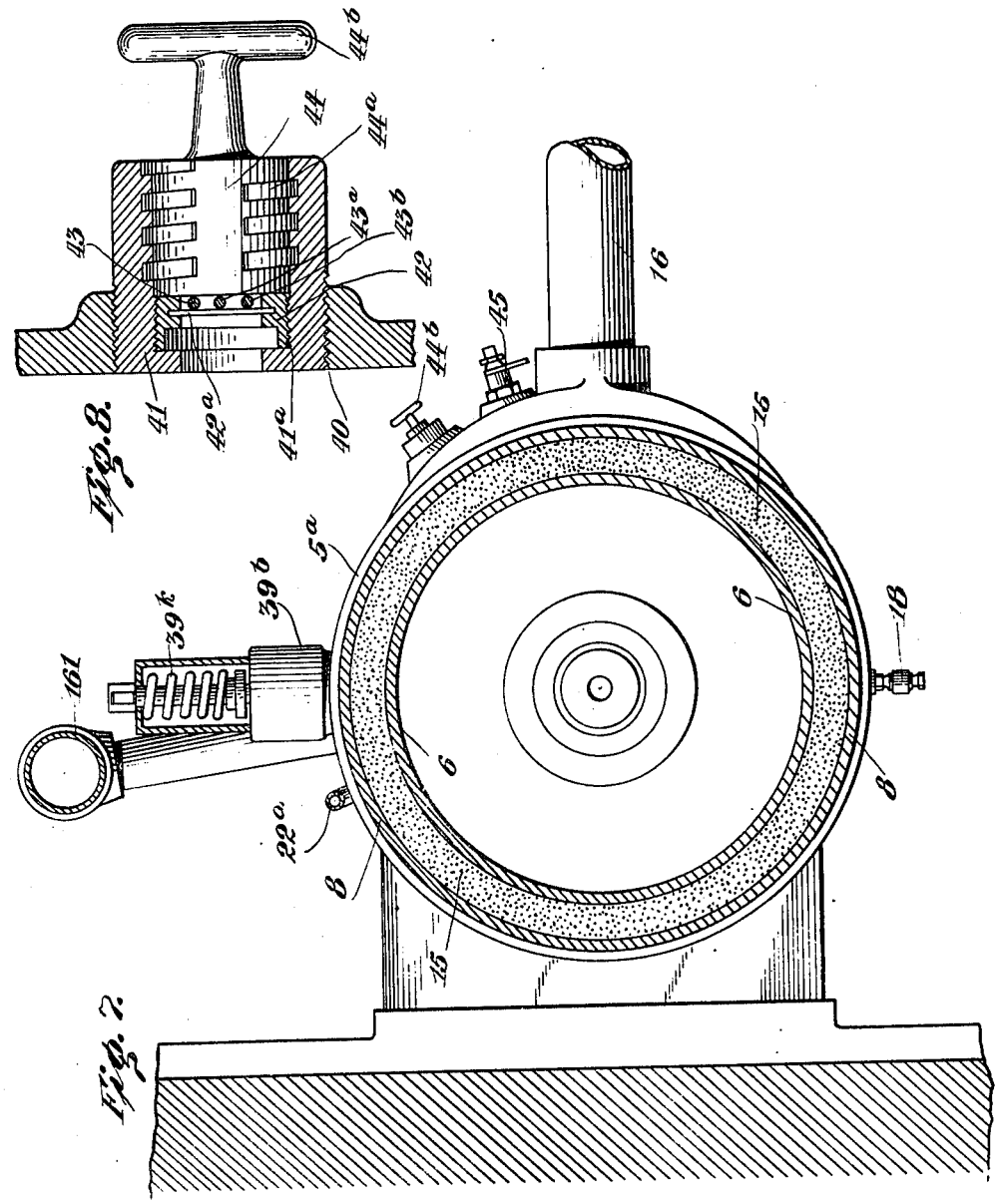

E. & W. H. TAYLOR.
APPARATUS FOR GENERATING AND UTILIZING MOTIVE FLUIDS.
APPLICATION FILED OCT. 9, 1911.
1,241,780.
Patented Oct. 2, 1917.
11 SHEETS—SHEET 6.
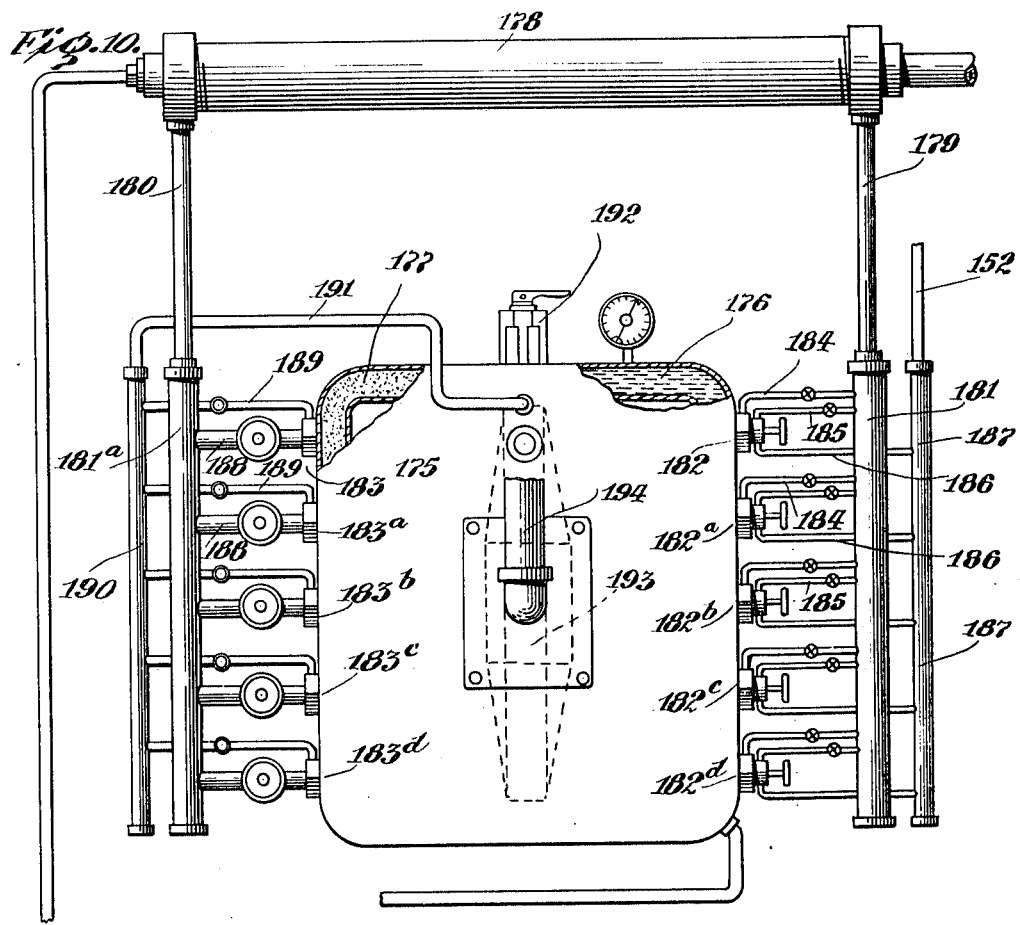
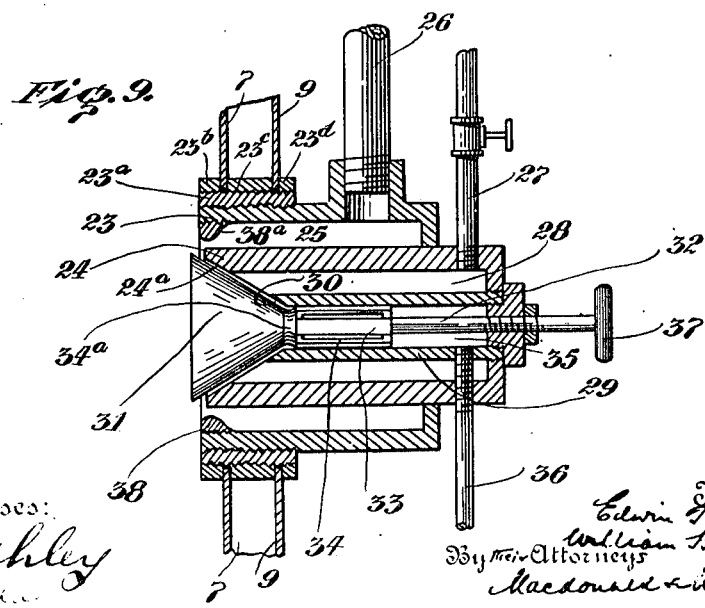

E. & W. H. TAYLOR.
APPARATUS FOR GENERATING AND UTILIZING MOTIVE FLUIDS.
APPLICATION FILED OCT. 9, 1911.
1,241,780.
Patented Oct. 2, 1917.
11 SHEETS—SHEET 7.
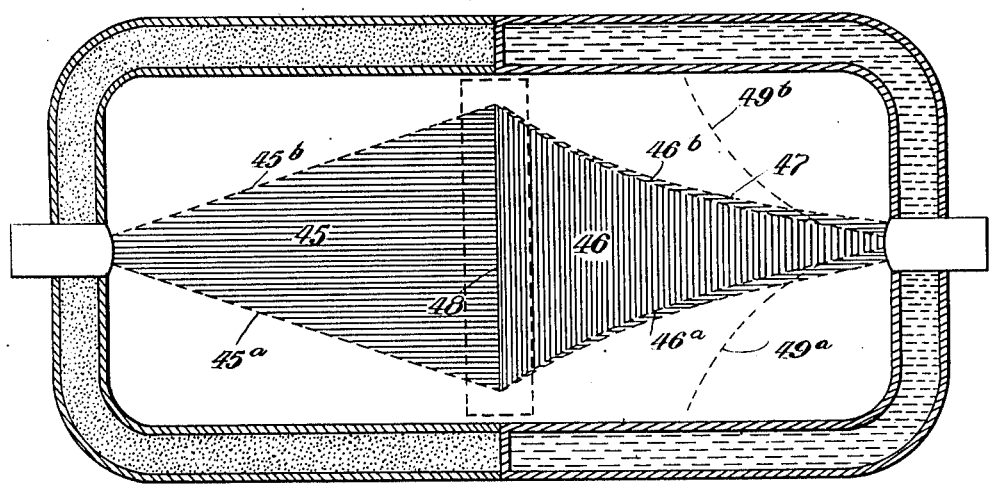
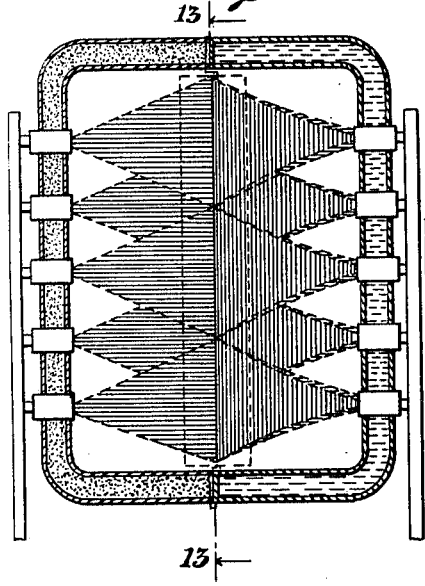
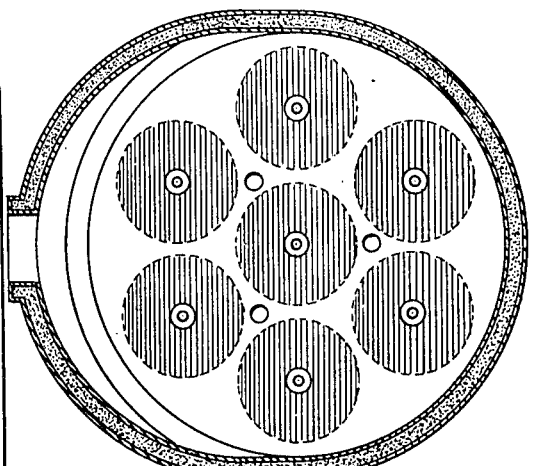

E. & W. H. TAYLOR.
APPARATUS FOR GENERATING AND UTILIZING MOTIVE FLUIDS.
APPLICATION FILED OCT. 9, 1911.
1,241,780.
Patented Oct. 2, 1917.
11 SHEETS—SHEET 8.
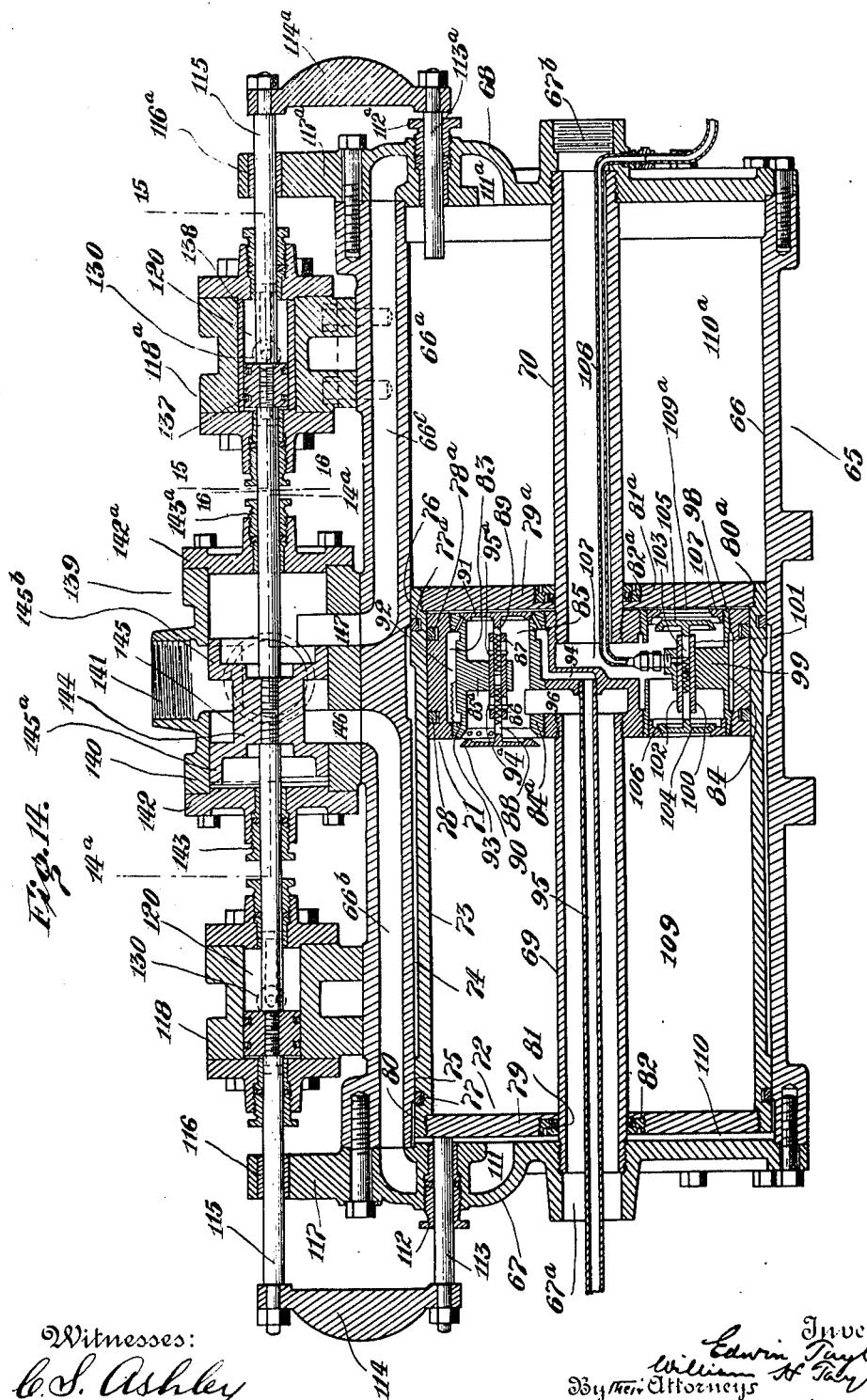
Witnesses:
C. S. Ashley
Inventors
Edwin Taylor
William H. Taylor
By their Attorneys
Macdonald & Macdonald

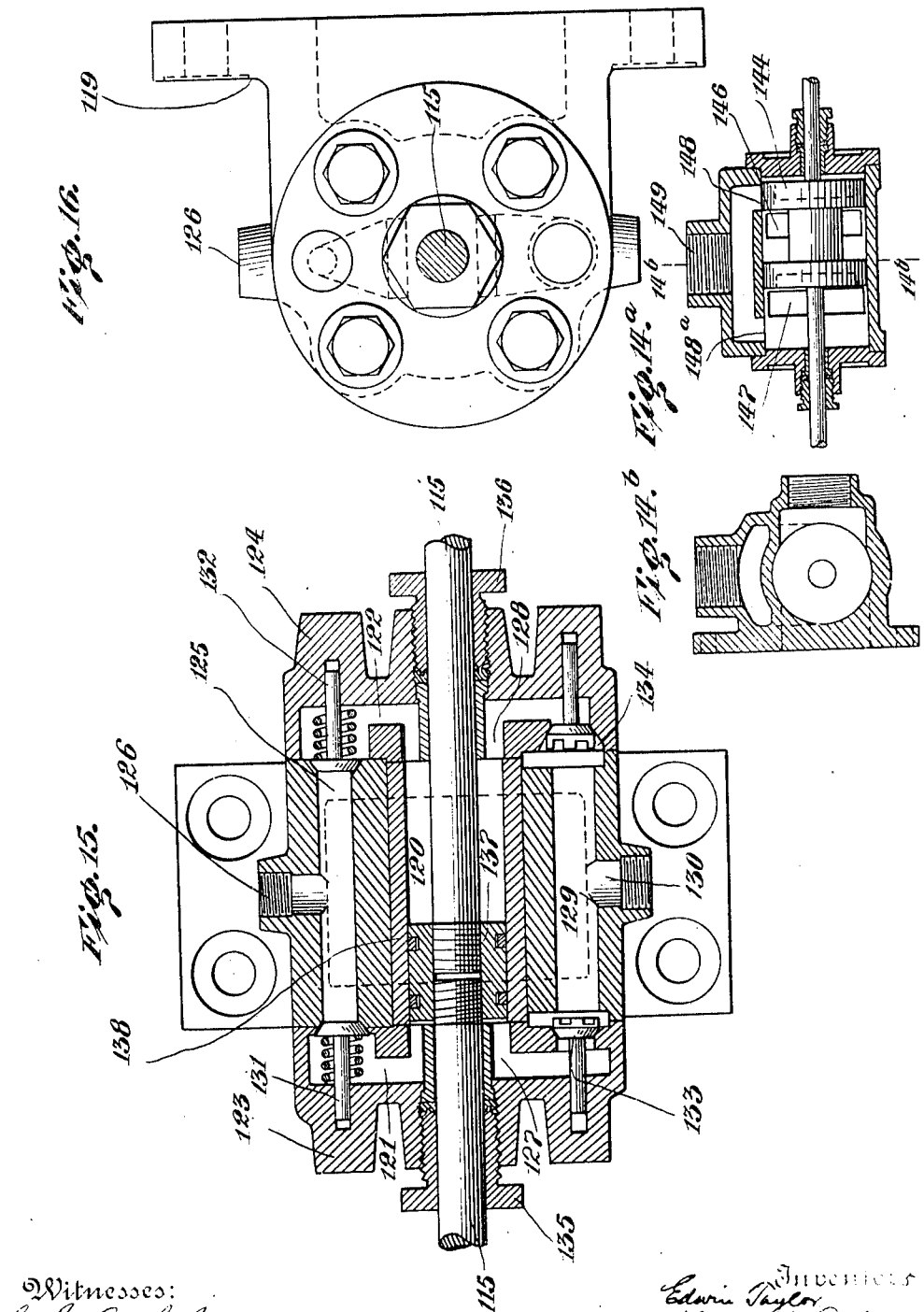

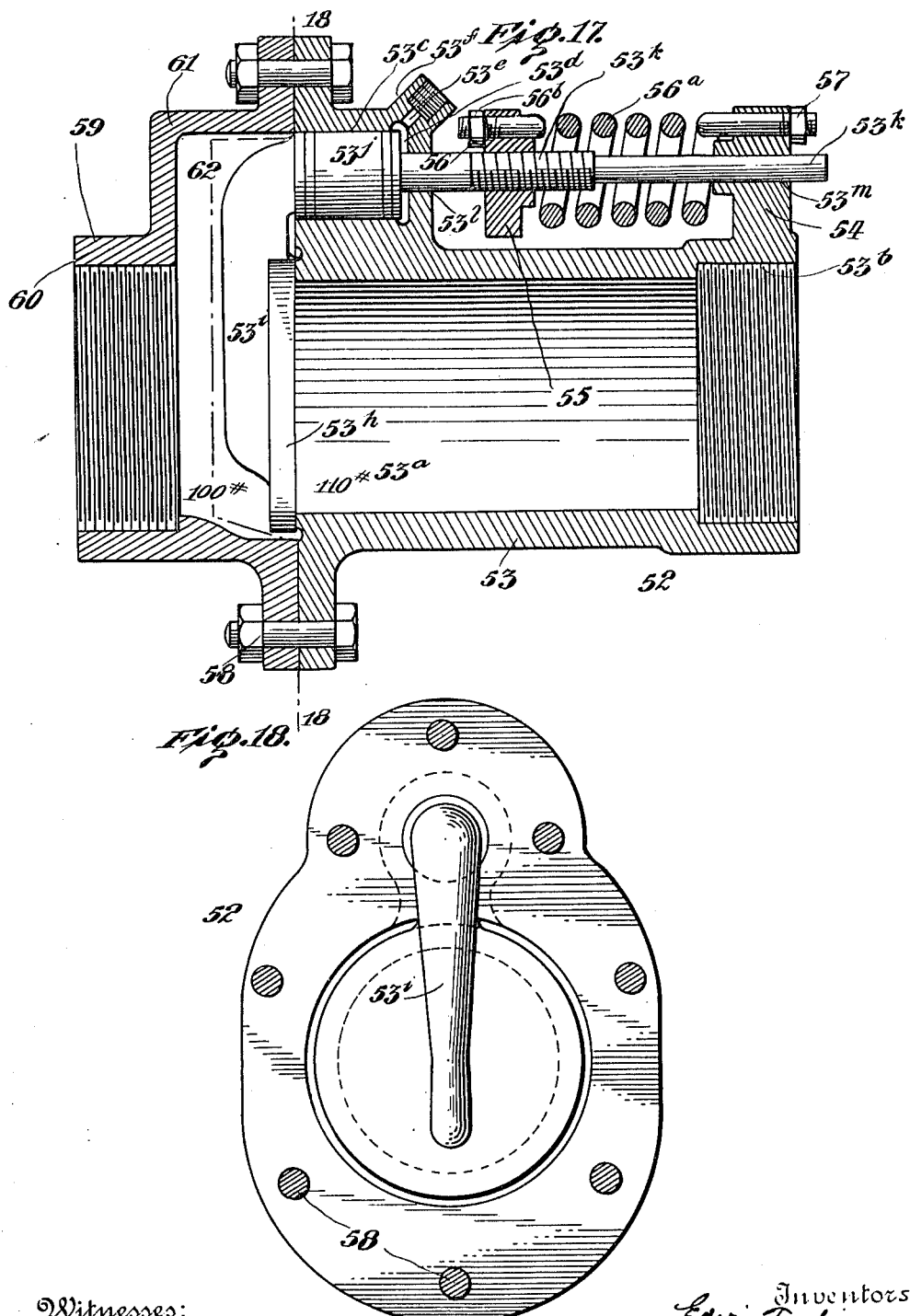

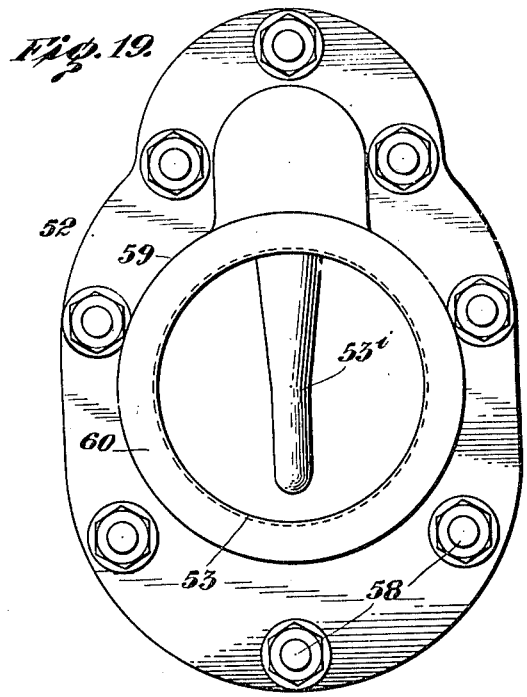
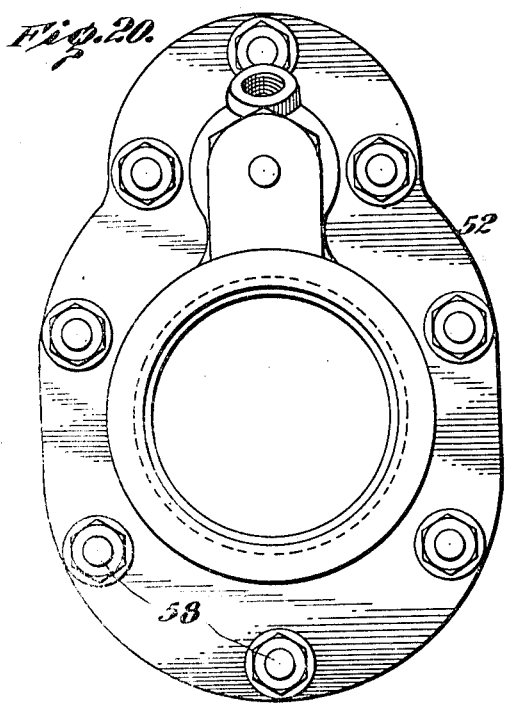

UNITED STATES PATENT OFFICE.

EDWIN TAYLOR, OF BROOKLYN, AND WILLIAM H. TAYLOR, OF NEW YORK, N. Y., ASSIGNORS, BY MESNE ASSIGNMENTS, TO TAYLOR-HUBBARD COMPANY, A CORPORATION OF NEW YORK.

APPARATUS FOR GENERATING AND UTILIZING MOTIVE FLUIDS.

1,241,780.      Specification of Letters Patent.      Patented Oct. 2, 1917.

Application filed October 9, 1911. Serial No. 653,608.

*To all whom it may concern:*

Be it known that we, EDWIN TAYLOR, of the city of New York, borough of Brooklyn, county of Kings, and State of New York, and WILLIAM H. TAYLOR, of the city of New York, borough of Manhattan, in the county of New York and State of New York, have invented certain new and useful Improvements in Apparatus for Generating and Utilizing Motive Fluids, of which the following is a full, clear, and exact specification, such as will enable others skilled in the art to which it appertains to make and use the same.

This invention relates to apparatus for the generation and application of motive fluid.

One object is the production by economical means of motive fluid capable of all the uses to which motive fluid can be applied, for example expansively in an engine or other prime mover, or for heating purposes.

Another object of our invention is to provide an apparatus for generating motive fluid for operating a prime mover or for heating purposes, or both, which apparatus embodies self-contained operating means which is itself operated by the motive fluid thus generated.

Another object is to provide means whereby a portion of the motive fluid is diverted for use in the operation of the apparatus, and thereafter joined with the main body of the fluid, for utilization at the point at which the fluid is designed to be ultimately used.

Another object is to provide an apparatus for the production of motive fluid of high temperature at any desired pressure, for the heating of buildings, steam tables, bake ovens, and many other purposes.

Another object is to provide apparatus whereby the motive fluid is very quickly generated and the pressure or temperature, or both, readily raised or lowered within a very short space of time to meet varying conditions.

Another object of our invention is to provide apparatus which is applicable to the generation of power to almost any desired amount, and which may be quickly increased or decreased in amount to suit varying conditions.

Another object is to provide means whereby a portion of the products of combustion are utilized to aid in such combustion and generation of the motive fluid.

Another object is to provide apparatus whereby hydrocarbon materials may be used in the production of said motive fluid which it has hitherto been impossible to use in ordinary engine practice.

Another object is the production of such motive fluid under such conditions that the hydrocarbon materials used are entirely consumed.

Another object is to provide means whereby such consumption of fuel, whether solid, liquid or gaseous is effected with the greatest thermal efficiency.

These objects are attained by means of apparatus which is economical both in construction and operation.

The apparatus which we have provided for accomplishing these objects, comprises, (1) a motive-fluid generating chamber, of which we show two forms, one of which may be employed when large horse-power is required: in each form, however, there is employed the principle of projecting into a closed generating chamber a heat developing jet and a heat absorbing jet, which are led into the chamber in the form of cones and in such relation one to the other that they form an approximately circular plane of impact constituting a common cone base, this being due to the impacting of one jet against the other in a plane at right angles to their axes, the diameter of said circular plane of impact being less than the diameter of the generating chamber, the compressed air by which they are brought into the generating chamber not only effecting the atomization of the materials composing the jets and furnishing the oxygen necessary to the combustion of the hydrocarbon materials comprising the fuel jet, but likewise governing the formation and action of both jets: (2) a combined air compressor and pump, operated by by-passing by means of and around a suitable reducing valve a portion of the motive fluid from the generating chamber to the air compressor, which, in turn compresses air for use in the generating chamber and pumps the fuel and water necessary to the operation of said chamber: (3) a new and improved reducing valve, the function of which is to maintain a higher pressure on the generator side of said valve than on the other and thereby allowing a portion of the motive fluid to perform work in the compressor and escape by a slight expansion to the low pressure side of the reducing valve there meeting the main body of gas and vapor, also slightly expanded: (4) a condenser of any suitable form, in which the useful products of combustion, after performing their function as a motive fluid in an engine or other heat utilizing device, are condensed to form distilled water for use in the generator: (5) connections between the several elements uniting the entire apparatus into one complete operative unit and so arranged that a maximum amount of heat is developed and retained in said apparatus.

All of the foregoing recited objects and the apparatus for accomplishing the same will be made clear by the following description, in connection with the accompanying drawings, in which,—

Figure 1 is a front elevation of the entire connected apparatus, partly diagrammatic;

Fig. 2 is a side elevation of same;

Fig. 3 is a view partly in front elevation and partly in vertical longitudinal section of the generating chamber;

Fig. 4 is a vertical cross section on line 4—4 of Fig. 3, with parts removed;

Fig. 5 is a horizontal section on line 5—5 of Fig. 4;

Fig. 6 is a front elevation from the right-hand side of the part shown in Fig. 4;

Fig. 7 is a cross section on line 7—7 of Fig. 3;

Fig. 8 is a sectional detail of a peep-hole plug, shown in elevation in Fig. 7;

Fig. 9 is a section showing the fuel and compressed air feed for the generating chamber;

Fig. 10 is a front elevation showing a modified form of generating chamber for high-power plants, and suitable for variable loads;

Fig. 11 is a view largely diagrammatic to illustrate the action of the heat developing and heat absorbing jets in the generating chamber;

Figs. 12 and 13 are similar views illustrating the action of those jets in a generating chamber such as that shown in Fig. 10;

Fig. 14 is a horizontal section on line 14—14 of Fig. 2;

Fig. 14$^a$ is a longitudinal section through the center of the motive fluid valve casing on line 14$^a$—14$^a$ of Fig. 14;

Fig. 14$^b$ is a cross section on line 14$^b$—14$^b$ of Fig. 14$^a$, with the piston valve in said casing removed;

Fig. 15 is a vertical cross section of the oil pump actuated by the air compressor, on line 15—15 of Fig. 14;

Fig. 16 is an end view thereof on line 16—16 of Fig. 14;

Fig. 17 is a longitudinal vertical section of our improved reducing valve, through the center thereof;

Fig. 18 is an end elevation on line 18—18 of Fig. 17 with the cap removed;

Fig. 19 is an elevation with said cap in place; and

Fig. 20 is an elevation at the end opposite that shown in Fig. 19.

In Figs. 1 and 2, the apparatus is shown as secured to a side wall 2 by means of a supporting side plate 3 and the screw bolts 4. 5 indicates in whole a closed generating chamber the construction of which is more clearly shown in Fig. 3. It comprises a central annular holding member 5$^a$, formed preferably as a single casting, which is provided with a plurality of threaded inner surfaces 5$^b$, 5$^c$, 5$^d$, 5$^e$. Secured to each end of the annular holding member 5$^a$ are a plurality of inner cylindrical shells 6, 7, the inner ends of which are threaded to engage the threads 5$^c$, 5$^e$ thereof. Also secured to said holding member 5$^a$ are a plurality of cylindrical shells 8, 9, having their inner ends threaded to engage the threads 5$^b$, 5$^d$. The outer portions of the shells 6, 7, 8, 9, are shaped to form heads 10, 11 and are provided with apertures for the reception of liquid and fuel injecting nozzles 12, 13. The casings 6, 8, and 7, 9, are spaced apart to form on the one side a water jacket 14 and on the other side an insulating chamber 15 the said water jacket being supplied through a water inlet pipe 14$^a$, the connections to the source of supply of which will be hereinafter referred to. The insulating chamber 15, is preferably provided with some suitable heat-insulating material such as mineral wool, asbestos or the like.

The front side 15$^a$ of the annular holding member 5$^a$, is bellied out to provide space for a discharge chamber of crescent-like shape, indicated at 15$^b$, said chamber 15$^b$ being formed by a forwardly extending curved wall, as shown in cross-section in Fig. 5 and indicated at 15$^c$, having a flanged rearwardly extending member 15$^d$, the flanges of which are brought sufficiently close together at opposite sides to form an upwardly and downwardly extending curved slot indicated at 15$^e$, of uniform width throughout its extent and which affords a passageway into the chamber 15$^b$. As will be seen from Fig. 4 the cross sectional area of the chamber 15$^b$ increases gradually from each end toward the middle thereof, and at this point of approximately greatest width the wall 15ᶜ is provided with a central orifice 16, through which the gases make their escape from the chamber 15ᵇ. It will be seen that we thus afford means for the escape of a maximum amount of the gases in the generating chamber at a minimum velocity through the primary outlet said primary outlet being made of relatively great length in order that the gases may be taken off uniformly from as wide a circumference as possible, from the primary outlet the gases being led into the discharge chamber and thence into the secondary outlet 16. This construction is especially designed to avoid to the greatest possible extent the distortion of the heat developing and heat absorbing jets at their circular plane of impact in the generating chamber, and its utility will be more readily apparent when we come to consider hereafter the action of those jets.

The holding member 5ᵃ of the generating chamber is apertured and provided with a blow-off cock 17, and the outer wall 9 is apertured and provided with a cock 18, the former to drain off from the interior of the chamber any water or other liquid which should accumulate therein through accidental leakage or otherwise, and the latter to drain the water jacket whenever it should become desirable so to do.

The liquid injecting nozzle 12 comprises a nozzle casing 19, which is exteriorly threaded at 19ᵃ for the reception of an internally and externally threaded nipple 19ᵇ to which are secured internally threaded lock nuts 19ᶜ, 19ᵈ, 19ᵉ, which hold in place and properly space apart the heads of the shells 6, 8. Said nozzle casing 19 is also internally threaded at 20 to receive the threaded end of a jet former 21, which is provided with an inwardly converging wall 21ᵃ and a lateral extension thereof 21ᵇ. The casing 19 is bored longitudinally to provide a cylindrical air chamber 21ᶜ, and is also similarly bored to form a water chamber 21ᵈ, through the latter of which projects a cone valve indicated at 21ᵉ, which is controlled by the valve stem 21ᵈˣ, provided with circular guide lugs 21ᶠ sliding on the walls of the water chamber 21ᵈ, and held in place by the threaded plug 21ᵍ. Said valve has a cone-shaped surface and is adapted to seat on an inverted cone valve seat 21ʰ, being controlled by the hand wheel 21ⁱ.

Compressed air is admitted to the compressed air chamber 21ᶜ through the supply pipe 22, the source of supply for which will be hereinafter referred to. The liquid chamber 21ᵈ is normally supplied with water or other fluid, from the water jacket 14, through the pipe 22ᵃ, having a connection with the liquid chamber 21ᵈ at 22ᵇ and the liquid so admitted passes over the surface of the cone valve 21ᵉ and is atomized by the inrushing compressed air, passing into the interior of the generating chamber in the form of a finely divided spray or mist.

The fuel injecting nozzle 13 the construction of which is more particularly illustrated in Fig. 9 comprises a cylindrical nozzle casing 23, which is secured to the head of the shells 7, 9, by the internally and externally threaded nipple 23ᵃ, and lock nuts 23ᵇ, 23ᶜ, 23ᵈ. Within the casing 23 is a cylindrical wall or inner casing 24, which is spaced from the outer casing 23 to form a compressed air chamber 25, to which air is supplied by means of a pipe 26 which pipe also supplies, through the by-pass pipe 27, compressed air to a secondary compressed air chamber 28 formed by a cylindrical valve casing 29, the outer end of which is beveled as at 30 to form a seat for a cone valve 31, carried by the stem 32 and guide 33. Said valve and stem are preferably formed in one integral piece, the guide 33 being provided with a series of longitudinal parallel grooves 34, and with an annular reduced portion indicated at 34ᵃ serving as a circular fuel distributing groove, the outer edge of which forms a continuation of the cone surface 31. Said longitudinal grooves 34 are also in communication with the interior of the casing 29, which forms a fuel chamber 35, to which and through the grooves 34 the liquid fuel is supplied by means of the pipe 36. The valve 31 is controlled by the hand wheel 37. The valve seat 30 of the valve 31 is so beveled as to form a tight joint when it is desired to completely close the nozzle. The outer end of the casing 24, is beveled at 24ᵃ in such a manner that said beveled edge is always to some extent open the space therebetween being increased or decreased as desired by the movement of said valve. The casing 23 is threaded near its outer end to receive an exteriorly threaded annular choke piece 38, having a jet directing surface, the function of which is to modify the angle of the jet issuing from the nozzle 13. The position of said choke piece, and consequently its modifying effect, may be readily changed by screwing or unscrewing the choke piece inwardly or outwardly as desired. Fuel is supplied from the fuel pipe 36 to the oil chamber 35, wherein a quantity of fuel is held at all times, and therefrom is led through the grooves 34 to the distributing grooves 34ᵃ and thence to the cone surface of the valve 31 whereon the same is evenly distributed, in position to be atomized and blown therefrom by the air supplied from the atomizing chamber 28, said air forming, through the aperture between the surface 24ᵃ and the surface of the cone, an atomizing jet. The oil on the cone surface is held thereto in a uniformly distributed very thin body until it reaches the end of the cone when it is torn therefrom and minutely atomized forming a liquid fuel jet, the action of which however is modified by the course of the compressed air jet supplied by the scavenging air chamber 25, the direction of which jet is governed by the choke piece 38. It will be seen that we not only provide, in addition to an atomizing air chamber and atomizing air jet leading therefrom for atomizing the oil, a supplemental scavenging jet, surrounding the atomizing jet, which not only modifies the direction of the fuel jet but also serves to supply oxygen to the outer layers of the fuel jet which, in the absence of the scavenging jet, would be in contact with the cooler gases coming from the impacting jets, which gases would dilute the air required for combustion of the fuel particles comprising the fuel jet and would retard, if not entirely, prevent combustion; in other words the scavenging jet serves as an insulating barrier between the outer layers of the burning fuel jet and the chemically inert and cooler products of combustion; as the scavenging jet supplies oxygen on all sides of the heat developing jet heat is developed instead of absorbed. Furthermore this supplemental air of the scavenging jet not only serves to absorb some of the heat which at such high temperatures could not be used, but being capable of subsequent expansion forms an important part of the motive fluid which is generated in the generating chamber and is transmitted therefrom for use externally as desired.

The annular holding member 5$^a$ of the generating chamber is further provided with a circular aperture 39, the walls of which are threaded at 39$^a$ to receive the threaded end of a valve bonnet 39$^b$, which is provided with an outlet 39$^c$ and a series of valve guides 39$^d$, spaced apart, which, with a horizontal cap-piece 39$^e$ and a vertical extension 39$^f$ of the bonnet serve to act as bearing surfaces for a piston valve 39$^g$, whose stem projects through an aperture in the cap-piece 39$^e$, through the bonnet extension 39$^f$ and is provided at its upper end with a cam lever 39$^h$, the cam extension of which is adapted to bear against the upper flat surface of the bonnet extension 39$^f$ (being held in position by a collar 39$^i$) and when operated by means of the handle 39$^j$ is adapted to raise the valve off its seat thereby opening to the atmosphere or relieving the pressure inside the generating chamber. The valve 39$^g$ is normally held to its seat by means of a coiled spring 39$^k$, one end of which rests against the upper end of the bonnet extension 39$^f$, and the other end of which bears against an adjusting nut 39$^l$, which is internally threaded and engages threads on the valve stem as, indicated at 39$^m$, whereby the force of said spring and its pressure on said valve may be increased or decreased.

The annular holding member 5$^a$ is apertured at 40, the walls thereof, being internally threaded to receive an externally threaded plug casing 41, which is provided with a cylindrical opening, the lower portion of the walls thereof being threaded at 41$^a$ to receive an externally threaded bushing 42, which is likewise centrally bored to receive a circular sheet of transparent material such as mica, or the like, indicated at 42$^a$ the outer periphery thereof being received within a horizontal groove in the inner wall of the bushing 42, said transparent sheet 42$^a$ being secured in place, against pressure from within by a series of cross bars 43, 43$^a$, 43$^b$, the ends thereof being secured in the wall of said bushing.

The inner surface of the plug casing 41 is provided with an interrupted thread to receive and hold a removable breech-block plug 44, similarly threaded as indicated at 44$^a$, the latter being operated by the hand wheel 44$^b$. The lower surface of the plug, when secured in position, rests tightly against the upper surface of the threaded bushing 42, so as to secure a tight closure therebetween.

The removable plug 44 affords a convenient and ready means of viewing the interior of the generating chamber to observe the action of the jets therein.

The annular member 5$^a$ is also provided with a removable spark plug 44$^x$ which is secured thereto by interrupted threads precisely as referred to in describing the construction of the breech-block plug 44. This spark plug 44$^x$ will be connected to any suitable source of electrical supply for the purpose of lighting the fuel jet within the generating chamber, and if for any reason the electric current should fail, the manner of connection affords a ready means of access to the interior of the generating chamber by simply removing the spark plug and effecting the lighting operation by means of a torch.

The principle employed in our generating chamber of projecting thereinto a heat developing jet and a heat absorbing jet in the form of cones, and so as to form an approximately circular plane of impact, is well illustrated in Figs. 11, 12, 13, the former of which is more especially directed to a construction wherein a single heat developing jet and a single heat absorbing jet are employed.

Referring particularly to Fig. 11, the horizontally shaded portion indicated at 45, shows the heat absorbing jet, the lines 45$^a$, 45$^b$, indicating the line of projection and diffusion, and the vertically shaded portion indicated at 46 shows the heat developing jet and the lines 46ª, 46ᵇ, indicate the line of projection and expansion thereof under action of the atomizing air jet and scavenging air jet, the latter being indicated by the horizontally shaded portion 47. It will be observed that, as indicated at 48, a plane of impact is formed approximately circular in form and concentric with the axes of the cones 45, 46 of which said plane of impact 48 forms a common base. The angle of inclination of the entering jets must be so proportioned, one to the other, as to secure this result of a common base for the resultant cones, it being evident that if such angles were equal and the mass of the material comprising the heat absorbing jet were equal to that of the heat developing jet such a result could not be reached, and therefore the jets and materials used must be so proportioned one to the other as to properly balance at the point of meeting constituting the cone base. Assuming that liquid fuel is led into the generating chamber through the chamber 35 and thence to the cone-shaped valve 31 and is blown therefrom and atomized by compressed air admitted through the chamber 28, the normal tendency of the atomized fuel would be to the position indicated by the dotted lines 49ª, 49ᵇ, but the compressed air admitted through the scavenging air chamber 25 which is taken from an air supply common to both chambers, deflected by the choke piece 38 picks up the fuel and air jet, and causes it to take the position indicated by the lines 46ª, 46ᵇ the direction of said scavenging jet being adapted to be changed or modified as occasion may require by screwing inwardly or unscrewing outwardly the choke piece 38. The result of the impacting of the heat developing jet and heat absorbing jet is that the extremely high temperature of the heat developing jet is partly absorbed by the minute particles comprising the heat absorbing jet, so that the latter is converted into a highly superheated vapor at the instant of impact and answering the law of resultant forces the commingling gases and vapors are driven from the plane of impact in a series of swirls and with a rotary motion which carries them away from the oncoming particles succeeding them in their positions within the respective jets. The result of the action is that adjacent the periphery of the plane of impact or what we have referred to as the common base of the jet cones, there will be present on each side thereof a ring of commingling gases and vapors, said ring being formed by the gases traveling with a vortex or smoke ring movement, from which ring portions of the gases are constantly being taken off on all sides of the cone between its periphery and the walls of the generating chamber, some portions of which gases will be drawn directly to the outlet indicated at 16, other portions of which will take positions in other parts of the generating chamber, outside, however, in large measure, the jet cones and aided so by the scavenging air jet, which, traveling with a greater velocity than the gases last referred to, tends not only to afford a barrier therebetween but also said scavenging jet and the fuel particles infolded thereby being heavier than the referred to gases tend to deflect the gases therefrom, in accordance with the law of inertia governing heavier and lighter bodies and preventing the mixing of the materials of the jets with the gases resulting from combustion.

These gases, which are at a cooler temperature than the materials of combustion also serve to form an aqueous vapor or blanket between the highly heated fuel jet and the water jacket of the generating chamber, thereby not only preventing direct contact with and damage to the walls of the generating chamber by the extremely high heat emanating from the fuel jet but, preventing to a considerable degree, said heat being radiated and conducted through the walls of the water jacket, thereby retaining in said aqueous vapor heat units which would otherwise be lost through the walls of the water jacket.

While it might appear at first glance, that, as the particles of materials comprising the heat absorbing jet are of greater specific gravity than the particles of materials comprising the heat developing jet, the one would overbalance the other so as not to form what we have herein referred to as a plane of impact, yet it is to be borne in mind that this difference in specific gravity is made up by the difference in velocity with which the two jets travel to their point of meeting, since it is self evident that even though the amount of air admitted to both jets were the same, (which however is not the case), the velocity of the heat developing jet is very greatly enhanced by the combustion of the particles comprising this jet and the attendant liberation of large volumes of heated gases with what may perhaps be properly termed an explosive effect, since their course is from the point of lower combustion to that of higher combustion; in addition to this however is the added force in our apparatus of what we have termed the scavenging jet. Thus the product of the velocity and mass of the particles of the heat absorbing jet and the product of the velocity and mass of the heat developing jet are so balanced that it is readily seen how the circular plane of impact to which we have referred is brought about. Furthermore it has been shown by experiment that this plane of impact may be varied within wide limits longitudinally of the generating chamber by simply varying the velocities and the amounts of the materials comprising the respective jets.

The radiant heat from the fuel jet is extremely high reaching between six and eight thousand degrees Fahrenheit, therefore, we provide the water jacket herein before referred to and indicated at 14, on that side of the generator. The other side of the generator, containing the heat absorbing jet is not at nearly as high a temperature and to provide against heat losses through the generating chamber walls, we provide the insulation herein before referred to indicated at 15.

The motive fluid, comprising a mixture of the gases resulting from the combustion of the hydrocarbon materials of the heat developing jet and the super-heated vapor resulting from the contact of the heat absorbing jet with the heat developing jet, is led through the outlet 16 of the generating chamber into a main 50 and through it to a point therein at which, through a by-pass pipe 51, a portion of the motive fluid is led to an air compressor to be hereinafter referred to, and beyond which point the main body of the motive fluid passes to a reducing valve indicated at 52.

The construction and operation of said reducing valve will now be described, the same being more clearly represented in Figs. 17, 18, 19 and 20, the point of its application and of the by-pass pipe just referred to, being illustrated in Figs. 1 and 2.

The principal object of this reducing valve is to afford means whereby the air compressor may be operated by motive fluid from the generating chamber with a maximum economy in the use of said fluid. This operation is effectuated through said reducing valve by reducing the pressure of the motive fluid on the delivery end of the main 50 so that that portion of the motive fluid which is used for operating the air compressor may be exhausted into the delivery end of the main and subsequently utilized in conjunction with the main body of the motive fluid for operating a prime mover or used for other purposes, the difference in pressure between the delivery end of the motive fluid main and the generator end of said main being utilized for operating said air compressor.

The reducing valve 52 comprises a valve casing 53, having a cylindrical bore $53^a$ for the passage of the motive fluid therethrough, and is threaded as at $53^b$, to form a connection with the main 50. Said valve casing 53 is preferably made as one casting and is bored at $53^c$, the walls of said bore forming a piston chamber, having an enlarged portion at $53^d$, from which leads an exhaust passage $53^e$ through a diagonal extension $53^f$, the same being threaded for connection with a suitable drain pipe represented at $53^g$ in Fig. 2, the purpose of said exhaust passage $53^e$ being to prevent back pressure against the piston presently to be referred to. The outer ends of the casing 53 are machine faced, so as to afford a tight valve-seat connection with the circular diaphragm indicated at $53^h$, which is supported in position by the carrier arm $53^i$, formed integral with and moved by the piston $53^j$, the latter being adapted to reciprocate in the piston chamber $53^c$. Said piston has formed integral therewith a piston arm $53^k$, which is adapted to slide within, and be guided by, the walls of apertures $53^l$, $53^m$, the former extending through the rear face of the piston chamber $53^c$, and the other through a perpendicular extension 54, of the valve casing 53. The forward end of the piston arm $53^k$ is screw threaded to receive an internally threaded adjusting nut 55, one portion of which, as indicated at 56, is bored to receive one end of a coiled spring $56^a$ held in place by the threaded nut $56^b$, the other end of which spring projects through an aperture in the extension 54 of the casing 53, being screw-threaded and held in place by a threaded nut 57. Secured to the valve casing 53 by bolts 58 is a valve bonnet 59, which comprises a delivery neck 60, internally threaded for connection with the motive fluid main 50 and a flanged rearward extension thereof indicated at 61, the interior walls of which form a combined diaphragm and fluid expansion chamber indicated at 62, wherein, under action of the spring $56^a$ or the pressure of the gases passing through said valve, said diaphragm may be reciprocated to increase or decrease the size of the outlet from the passageway $53^a$ to the delivery side of the valve or to entirely open or close the same.

In normal operation, disregarding any question of pressure in the reducing valve, the force of the spring will be normally to hold the diaphragm $53^h$ lightly in closed position, said spring being provided more largely to overcome the dynamic force of the gases rushing through the chamber $53^a$ and contacting with the diaphragm $53^h$. The spring $56^a$ will be adjusted so as to hold the diaphragm $53^h$ in any desired balanced position under pressure of the motive fluid and said spring, when adjusted, in connection with the piston $53^j$ will not only retain on the generator side of the diaphragm $53^h$, such desired excess pressure above that which is desired on the delivery side of said diaphragm, but when so adjusted for any desired difference of pressure the valve is self acting to retain the same thereat; for example, assuming that it is desired to have the pressure of the motive fluid on the generator side of the diaphragm $53^h$, at 110 pounds pressure, and on the delivery side at 100 pounds, the force of the spring will be overcome by the movement of the piston 53ʲ sufficiently to afford a passageway for the motive fluid around the diaphragm 53ʰ, and give 100 pounds pressure on the delivery side of said diaphragm, and this position will be maintained until the pressure on the delivery side of said diaphragm is increased or decreased, which will govern the further movement of the diaphragm. Assuming now that the pressure on the delivery side is increased 10 pounds, the result will be that this excess pressure acting on the piston 53ʲ will close the diaphragm 53ʰ, thereby choking the passage of the motive fluid by and around the diaphragm, thereby cutting down the pressure on the delivery side of the diaphragm.

The importance of this automatic self-governing pressure control valve will be more apparent when we come to consider the operation of the compressor to which we have above referred.

This reducing valve, being designed for the passage therethrough of gases in a highly heated condition, we have constructed the same in such a manner that it will be self acting notwithstanding that all of its parts are made of metal, and of those parts, the one which would be more readily affected by the heat is so placed that it cannot itself come in direct contact therewith.

As already stated, by means of the reducing valve, a portion of the motive fluid from the generating chamber is diverted for operating the air compressor, after which that portion of the motive fluid joins the main body thereof for the ultimate use for which it is designed.

The high pressure by-passed motive fluid, is led from the by-pass pipe 51 to the motive fluid inlet of a combined air compressor and fuel and water pump, indicated in whole at 65, the construction of which is more clearly shown in horizontal longitudinal section in Fig. 14 and will now be described.

The combined air compressor and pump 65 comprises a cylindrical body or shell 66, which is thickened, as at 66ᵃ to provide for a plurality of longitudinal steam passages indicated at 66ᵇ, 66ᶜ. Said cylindrical body may be formed in any suitable manner, but preferably we form the same in one integral piece as a casting with the said steam passages formed therein.

At each end of the cylindrical body 66 we provide a cylinder head indicated at 67, 68, each of which is provided with a bore extending therethrough indicated at 67ᵃ, 67ᵇ, the walls of said bores being threaded to receive and support one end of a pair of tubes indicated at 69, 70, the other ends of said tubes being supported and adapted to secure in place, a fixed piston indicated in whole at 71 stationed midway the interior of the cylindrical body 66. These tubes also act as slide rods for a free piston indicated in whole at 72, and also act as inlet and delivery tubes for fluid admitted to and discharged from the compressing chambers of the compressor.

The free piston 72 comprises a cylindrical body 73 which intermediate its ends is provided with a reduced portion forming a clearance space 74 and, adjacent thereto a plurality of annular bearing surfaces 75, 76, in which are placed outwardly expanding packing rings 77, 77ᵃ, whereby a tight sliding connection is made with the interior surface of the outer cylindrical body 66. Similar packing rings 78, 78ᵃ are provided at the outer periphery of the fixed piston 71, whereby a tight sliding connection is made between the interior surface of the free piston and the outer surface of said fixed piston. The free piston 72 also comprises a plurality of circular heads 79, 79ᵃ the outer periphery of each of which is screw threaded for threaded engagement with the cylindrical body 73, as indicated at 80, 80ᵃ, said heads being also provided at their central portions with a plurality of inwardly expanding packing rings indicated at 81, 81ᵃ, secured in position by threaded washers 82, 82ᵃ, said packing rings affording a tight sliding connection between the heads 79, 79ᵃ, and the tubes 69, 70.

The fixed piston 71 is cored at its upper and lower centers to form a plurality of chambers 83, 84. The inner wall of the chamber 83 is threaded to receive and hold in place a bushing 84ᵃ which is cored internally to afford a fluid chamber indicated at 85, and provided with a downwardly extending holding arm or partition 85ᵃ, the latter having lateral extensions thereof 86, 87, through bores in which extend in opposite directions valve stems 88, 89, carrying the valves 90, 91 each of which is adapted to open and close a passageway from the chamber 85 into and from the interior of the free piston 72, at each side of the fixed piston 71. The outer surface of the bushing or valve casing 84ᵃ is so cored as to form, in conjunction with similar cores on the interior surface of the fixed piston 71, an annular water chamber 92, from which lead a plurality of small apertures or water passages 93, whereby water may be admitted by suction or otherwise to the interior of the free piston 72. Communicating with the water chamber 92 is a water passage 94, to which water or other liquid may be supplied through a pipe 95 passing through the tube 69. The valve casing 84ᵃ and the fixed piston 71 are provided with a passage therethrough 96 whereby a connection is made with the interior surface of the tube 69 and the fluid chamber 85.

The extensions 86, 87 of the valve holding arm 85ᵃ are vertically slotted to receive a plurality of valve holding pins 94ª, 95ª, passing therethrough and through the valve stems 88, 89, sufficient clearance being provided in said slots to permit said pins to move laterally therein and said valve stems to move longitudinally. Said valves 90—91 are normally held to their seats by coiled springs encircling and secured to said stems and the arm 85ª.

The inner wall of the chamber 84 is threaded to receive and hold in place an internally and externally threaded bushing 98, provided with an upwardly extending valve holding arm 99, and lateral extensions of said arm 100—101, the latter being horizontally bored to receive the valve stems 102—103 of a plurality of inwardly opening valves 104—105, the seats for said valves being indicated at 106—107 comprising seating rings externally threaded and thereby secured within the bushing 98. The said valves 104—105 are normally held in closed position by means of a plurality of coiled springs in the valve stem bearings.

The interior of the bushing 98 communicates with a vertical passage 107, which, in turn, is in communication with the interior of the tube 70, which tube affords a discharge outlet for fluid compressed in the compressing chambers. Lubricating liquid may be supplied to the valve stems 102—103 by a pipe 108 passing through the tube 70, the outer end thereof being connected to any suitable source of lubricant supply.

It will be observed that the heads of the free piston 72 divide the interior of the outer cylinder 66 into four chambers indicated at 109, 109ª, 110, 110ª, each of which is of constantly varying dimensions in the operation of the apparatus, the former of which it will be proper to designate as compressing chambers; and the latter of which will be referred to as motive chambers, since the free piston is driven by motive fluid admitted to said chambers at the outer ends of the free piston, as hereinafter described.

Each of the cylinder heads 67, 68, is cored out in its upper portion to provide a steam passage 111, 111ª, each of which passages is in connection with and forms a continuation of the steam passages 66ᵇ, 66ᶜ. The heads 67, 68 are also provided with stuffing boxes 112, 112ª, through each of which, and through each of said heads projects a tappet rod 113, 113ª, said tappet rods being adapted to be reciprocated by the heads 79, 79ª of the free piston 72. The tappet rods 113, 113ª are connected by yokes 114, 114ª to a connecting rod 115, the ends of which are slidingly supported in bearings 116, 116ª formed by extensions 117, 117ª of the heads 67, 68.

Near each end of the cylindrical body 66 is a pump indicated in whole at 118, 118ª having formed thereon at the rear upper and lower sides thereof flange portions 119, for bolting the same to the compressor casing 66. Each of these pumps 118, 118ª comprises a casing having a suction chamber 120, which, as more clearly illustrated in vertical section in Fig. 15 communicates with water passages 121, 122, extending upwardly through the pump heads 123, 124, to communicate with an inlet chamber 125 and inlet port 126. Said suction chamber 120 also communicates through water passages 127, 128 with an outlet chamber 129 and an outlet port 130. The water passages 121, 122 are normally closed by outwardly opening suction valves 131, 132 and the water passages 127, 128, are normally closed by inwardly opening delivery valves 133, 134.

The connecting rod 115 passes through packing boxes 135, 136, and is secured to, and is adapted to reciprocate pump pistons 137, to draw fluid into said pump and discharge the same therefrom. On the suction stroke of the piston 137, fluid is drawn through the inlet port 126 and the chamber 125 past the valve 132 through the water passage 122 into the suction chamber 120, and on the delivery stroke of the piston, the valve 132 is closed, the valve 134 is opened and the liquid delivered into the outlet chamber 129 and through the outlet port 130. The operation of the valves, and the suction and delivery of water, on the opposite side of the pump is the same as that just described.

The two pumps indicated in whole at 118, 118ª are the same in all respects with the exception that the pump 118ª includes a liner indicated at 138, and the piston 137 being made smaller than that in the pump 118 for the reason that the pump 118ª is designed to pump liquid fuel in a lesser quantity than the quantity of water which the pump 118 is designed to supply. It will therefore be unnecessary to further describe both of said pumps, since the foregoing description makes clear the construction of both.

Also secured to the forward side of the cylindrical body 66 is a motive fluid inlet and exhaust outlet indicated in whole at 139, which comprises a cylindrical casing 140 having an inlet port 141 and heads 142, 142ª, rigidly secured to the member 140, and provided with packing boxes 143, 143ª, through which, and through said heads and the casing 140 projects the connecting rod 115, to which is fastened a piston valve 144, the latter being reciprocated by the movement of the connecting rod 115. Said valve is a balanced piston slide valve, the bearing surfaces of which conform to the circular wall of the casing 140, and is somewhat spool-shaped, provided with a round reduced portion or hub 145, about which and between the valve feet 145ª, 145ᵇ, the motive fluid may pass from the inlet 141 to and through passages 146, 147 in the wall of the casing 140 and into the motive fluid passages 66ᵇ, 66ᶜ. It will be seen that when the valve is in the position shown in Fig. 14 the motive fluid may pass around the hub 145 of the valve and into the motive fluid passage 66ᵇ, the valve foot, 145ᵇ closing communication between the inlet 141 and the motive fluid passage 66ᶜ. When however the valve is in the right hand position, the last named passage is in communication with the inlet 141 and the motive fluid passage thereto. The upper portion of the valve casing 140 is provided with motive fluid exhaust passages 148, 148ª which communicate with a common outlet 149, the outlets 148, 148ª being intermittently in communication with the passages 146, 147, depending upon the position of the valve 144. In the position shown in Fig. 14, the passages 66ᶜ and 147 are in communication with the outlet 149, through the exhaust passage 148ª and when the valve 144 is in the opposite side of the casing 140 the passages 66ᵇ and 146 will be in communication with said outlets through the exhaust passage 148. The inlet 126 of the liquid fuel pump is connected by a pipe 150 to the liquid fuel tank, indicated diagrammatically at 151 in Fig. 1, which may be of any suitable character and in any convenient location, and the outlet 130 of said oil pump is connected by a pipe 152 with the liquid fuel nozzle 13 of the generating chamber 5. The pipes 150 and 152 are connected by a by-pass pipe 152ª, provided with an upwardly opening check valve at 152ᵇ arranged also for manual opening and closing by means of the hand wheel 152ᶜ.

The water inlet 126 of the water pump is connected by a pipe 153 to a condenser indicated at 154 and also by the pipe 156 to a water tank indicated diagrammatically at 155. The outlet 130 of the water pump is connected by a pipe 157 to the inlet 14ª of the water jacket 14 of the generating chamber 5. The pipes 153, 157 are connected by a by-pass pipe 153ª having an upwardly opening check valve 153ᵇ also arranged for manual opening and closing by means of the hand wheel 153ᶜ. From the pipe 157 a by-pass connection is also made by the pipe 158 to the water pipe 95 within the tube 69 of the compressor body 66.

The motive fluid discharged or exhausted from the outlet 149 of the combined compressor and pump is led by the main 159 to a point of junction 160 with the main 50 on the low pressure side of the reducing valve for subsequent use in connection with the main body of the fluid passing through said valve.

The operation of the combined air compressor and pump would seem to require little description, being quite clear from the foregoing description. The motive fluid by which it is operated is led through the inlet 141 into the motive fluid passage 66ᵇ, the passage 111, into the motive chamber 110, to and behind the free piston head 79, said motive fluid admission being continued and moving the free piston to the right until the outer end of the free piston head 79ª contacts with the tappet rod 113ª, moving the same outwardly, thereby moving the connecting rod 115, and the valve 145 to shut off the supply of motive fluid to the passage 66ᵇ and admitting said fluid to the passage 66ᶜ and the passage 111ª to the motive chamber 110ª at the opposite end of the free piston. On this movement of the free piston the air which it will be assumed had been previously drawn into the chamber 109 through the tube 69, air passage 96 and valve 90, is compressed and expelled through the valve 104, thence through the discharge chamber 107 and through the discharge tube 70.

At the same time that the air was drawn into the chamber 109 a fine spray of water was admitted through the water chamber 92 and water passages 93 and on the compression stroke of the piston this finely divided spray absorbed some of the heat of compression and was expelled with the air thus compressed, in the form of heated vapor. On the compression stroke of the head 79, the head 79ª acts to draw into the chamber 109ª air through the tube 69 together with a finely divided spray of water and also acts to drive from the chamber at its outer end the exhaust fluid which previously acted as the motive fluid therein.

Thus on each movement of the free piston 72 motive fluid is admitted at one end to drive the same and is exhausted at the other end; on each movement air and water are drawn into one of the compressing chambers and air and heated water or vapor are expelled from the other; on each movement of the free piston one of the tappet rods 113, 113ª is actuated to supply motive fluid to one end of said piston and to exhaust such fluid from the other end; on each movement of the piston, through the tappet rods 113, 113ª the connecting rod 115 is reciprocated to supply water and oil, the former for transmission to the water jacket of the generator and by the by-pass pipe 158 to spray the air compressor; and the latter to supply oil to the fuel nozzle of the generating chamber.

It will be understood that it is desirable that the heat developing jets and heat absorbing jets in the generating chamber should have an oversupply, rather than an under supply, of the fuel and liquid used therefor, and while the pumps are designed to supply a uniform quantity, the by-pass pipes 152ᵃ, 153ᵃ, having upwardly opening check valves, are provided so that in case more of said fuel and liquid is pumped than the jets can take care of, at any time, the surplus may be forced back through the said by-pass pipes 152ᵃ, 153ᵃ, respectively, and through the check valves therein to the pipes 150, 153.

From the air discharge pipe 70 the compressed air is led by a pipe 160ᵃ, to a compressed air receiver or equalizer indicated at 161 from which it is led, by the pipe 162, to the water nozzle 12 of the generating chamber, and by the pipe 163 to the fuel nozzle 13 of the generating chamber.

It will be evident from the foregoing that we have provided a combined air compressor and pump which supplies and pumps the compressed air, water and fuel for operating the jets in the generator for generating motive fluid, and which is itself operated by merely a portion of the fluid so generated.

The compressed air receiver 161 may also be connected as at 164 to a hand pump 165 for manually pumping compressed air into the receiver 161 in starting the operation of the entire system of apparatus.

The motive fluid at the low pressure, including that used for operating the air compressor and pumps as well as the main body thereof passing through the reducing valve, is led from the main 50, by a connection indicated at 166 to the condenser 154 or by a connection 167 to a prime mover indicated at 168, from which also leads a connection 169 to the condenser 154. The connection 166 is provided with a valve 166ᵃ, whereby all the motive fluid may be directed through the prime mover but which will be adjusted to open at a pressure lower than the pressure in the generating chamber. The connection 167 is provided with a pop valve 167ᵃ, whereby all the motive fluid may be directed to the condenser, so that in case it is not desired to operate the prime mover it will not interfere with the operation of the rest of the apparatus and the generation of motive fluid. It will be understood however, that in place of the prime mover 168 any other heat utilizing device may be substituted or used in conjunction therewith, and in case its place is taken by a heating system the condenser 154 as well as the prime mover may be dispensed with, as the heat radiating system would also become a condensing system.

Stop valves are provided at 170 in the pipe connection 162 and 171 in the pipe connection 163, whereby the supply of compressed air to the respective heat developing and heat absorbing jets may be regulated as may be required.

Assuming that our apparatus is used for the first time water is admitted to the water jacket of the generator from the auxiliary water tank 155, through the pipes 156 and 153, the by-pass pipe 153ᵃ and the pipe 157; air is manually pumped into the receiver 161, and, with the blow-off valve 39ᵍ open, compressed air is admitted through the oil nozzle 13; oil is admitted through the pipe 150, the by-pass pipe 152ᵃ and the pipe 152, and the resultant finely atomized spray of oil is ignited by the spark plug 45 or any other desired manner; when the flame is nicely started compressed air from the pipe 22 and water through the pipe 22ᵃ is admitted through the water nozzle 12, whereby, a finely divided spray of water is admitted to the generating chamber, compressed air being continuously supplied by hand until it is seen that the heat developing jet and heat absorbing jet are properly adjusted, one to the other, whereupon the blow-off valve 39ᵍ is closed and the pressure of the motive fluid generated in the generating chamber rises and in a few moments the pressure will be sufficient (for example say four pounds) to operate the air compressor and pumps as already described, when the operation of the entire apparatus becomes automatic, and the pressure increases in the generating chamber until it is of the power necessary to do certain required work in addition to operating the compressor, pumps and jets.

Assuming that 110 pounds pressure is required in the generator for doing this work, the blow-off valve 39ᵍ will be set to blow-off pressure at that figure. In this connection, it is well to call attention to the fact, as illustrated in Fig. 14, that the area of the free piston heads, subjected to motive fluid pressure is 10 per cent. greater than the area of either side of the fixed piston comprising one of the walls of the compressing chambers, and that due to this difference in area, while 110 pounds pressure is exerted at the head of the free piston, the compressed air within the compressing chamber will be expelled at a pressure of 121 pounds or thereabout. Such difference in pressure between the blow-off pressure in the generating chamber and the pressure admitted to the jets, is relied upon to keep the jets always in operation, since it will be evident that without a difference in pressure the jets would not operate. Even if the difference in pressure were one pound rather than eleven, it would be sufficient for this purpose.

When properly regulated, the operation of the entire apparatus will be substantially self-governing. It is to be understood that the pressure in the generating chamber will depend upon the amount or volume of the materials comprising the heat developing jet and the amount or volume of liquid comprising the heat absorbing jet. Assuming that a pressure is required in the generating chamber of 110 pounds to furnish motive fluid at that pressure, for doing certain required work in addition to that of operating the air compressor, a portion of the motive fluid at 110 pounds is by-passed around the reducing valve and utilized for operating the air compressor, being exhausted therefrom at a loss of 10 pounds and joining the main body of the fluid on the delivery side of the reducing valve at 100 pounds pressure. If now a prime mover is utilizing the motive fluid at that side of the reducing valve at 100 pounds, any increase in pressure at that side of the reducing valve (due for example, to slowing or throttling the prime mover) would immediately act on that valve to choke it and admit less fluid therethrough. It would also produce a back pressure on the air compressor, since there would not be the same freedom of the motive fluid used therein to exhaust.

The difference in pressure between the high and low pressure sides of the reducing valve being relied upon for operating the air compressor, which in this case we assume to be 10 pounds, any factor which serves to cut down this difference would also cut down the working capacity of the air compressor, and this ability to work on small pressures is one feature in the working economy of the apparatus, for if the prime mover does not utilize the entire power supplied to it, and backs up pressure on the air compressor the air compressor will slow down and cease to supply the maximum quantity of compressed air and fuel to the generating chamber, thereby decreasing the output of motive fluid from said chamber.

The water jacket on the generating chamber forms an important feature of our invention, since its utility is not directed merely to saving the walls of the generator from destruction by the high heat generated therein, but is also designed to retain and transmit the heat absorbed in accomplishing said result, in the form of highly heated liquid to be injected into the generating chamber to comprise the heat absorbing jet; thus a large portion of the heat developed in the generating chamber which would otherwise be lost, is retained in the water of the water jacket and returned to the generating chamber at a high temperature, increasing the economy of the apparatus, for it is evident that the injection into the generating chamber of hot water in place of cold water, and especially hot water which has been heated by the heat of the generating chamber itself must result in greater economy than were cold water used or the water otherwise heated.

The temperature of the heat absorbing side of the generating chamber is always one that the metal of the generating chamber can withstand and we have here provided simply an insulating medium, whereby little loss occurs from radiation, but at the opposite end of the generating chamber the temperature is tremendously high, the radiant heat from the oil jets being exceedingly great, and the saving of heat units through the water jacket becomes a very important factor in the economy of the system.

Another economy in the construction and use of our apparatus is the feature of retaining in the system a large portion of the heat units utilized in the operation of the air compressor and generated in the compressing of the fluid therein. It has been pointed out that liquid is admitted to each of the compressing chambers on the suction stroke of the free piston; this is with a threefold object; first, to absorb the extremely high heat of compression and prevent such high heat exerting a destructive effect upon the smaller parts of the compressor, such as valves, piston packing rings, &c.; secondly, to retain and utilize the heat units developed in the air compressor and transmit the same to the generating chamber, in the form of hot vapor or steam, which is transmitted in company with the compressed air, to the compressed air receiver or equalizer and thence to the nozzle of the heat absorbing jet and of the heat developing jet; thirdly to utilize the heated vapor or steam in the atomization of the fuel, since it is well established that liquid fuel such as petroleum is much more readily atomized by heated compressed air with the aid of hot steam than otherwise.

Another feature which has been only slightly referred to in the early part of the specification, is that of the production of distilled water in the operation of the apparatus. It is well known that in the combustion of petroleum, which consists of carbon and hydrogen in varying proportions, the carbon unites with oxygen to form carbonic acid gas (carbon dioxid $CO_2$) and the hydrogen unites with oxygen to form water ($H_2O$). Both of these reactions liberate an exceedingly high heat, the uniting of the hydrogen and oxygen resulting in the formation of a highly super-heated steam and the uniting of the carbon and the oxygen giving an extremely highly heated gas. In our apparatus the high heat developed in the formation of the gases just referred to is in part absorbed by the air and liquid of the heat absorbing jet, the liquid of that jet also being converted into highly superheated steam. All of these gases, together with the oxygen and nitrogen of the respective jets which does not combine, commingle to form the motive fluid. As already referred to this motive fluid after utilization in the air compressor, in the prime mover, or other heat utilizing device, is conducted to the condenser indicated at 154, where the gaseous parts (nitrogen and carbonic acid gas and possibly some free oxygen) escape to the atmosphere and the liquefying portion of the motive fluid condenses to form distilled water. It has been demonstrated that for every pound of petroleum which is burned in the generating chamber one pound of water will be produced. After being started with a given amount of water, the apparatus, when using petroleum as the fuel, will form its own source of water supply, which water will be entirely free from scale forming materials, which is such a serious source of loss and difficulty in the operation of other forms of motive fluid generating apparatus.

This feature of water distillation is of further importance since apparatus of this character is capable of operation far removed from natural sources of water supply.

Referring to Figs. 10, 12 and 13, wherein is shown a modification of the generating chamber illustrated in Figs. 3 and 11.

This modification comprises a shell indicated at 175 which, except as to its shape, and the multiplicity of heat developing and heat absorbing jets therein, conforms in all essential respects to the generating chamber illustrated in Fig. 3, the water jacket being indicated at 176 and the insulating chamber at 177. The compressed air receiver or equalizer is indicated at 178, from which compressed air is led by pipes 179, 180 to manifolds 181, 181ª, the former for admitting air to a plurality of fuel nozzles indicated in whole at 182, 182ª, 182ᵇ, 182ᶜ, 182ᵈ, and the latter for admitting compressed air to a plurality of liquid nozzles indicated in whole at 183, 183ª, 183ᵇ, 183ᶜ, 183ᵈ.

The construction of said fuel nozzles and said liquid nozzles is the same as that shown in Figs. 3 and 9, the only material difference being that as there are a multiplicity of them each is connected to manifolds, instead of single pipes as in the case of Fig. 9, the compressed air manifold 181 being connected by a series of pipes 184 to the scavenging jet of the respective fuel nozzles and by a series of pipes 185 to the atomizing jet thereof. The fuel nozzles are likewise connected by a series of pipes 186 to a manifold 187, wherein is contained the fuel to be supplied to said nozzles, the latter being in communication with the fuel supply tank 151 through the pipe 152.

The liquid nozzles 183, 183ª, etc., are each connected by a series of pipes 188 with the manifold 181ª to supply compressed air thereto and are also connected by a series of pipes 189 with a manifold 190, which manifold is connected by the pipe 191 with the water jacket 176.

The blow-off valve indicated at 192 is of the same construction as that shown in Fig. 3.

The motive fluid discharge slot, which is similar in construction to that shown in Figs. 4, 5 and 6, only of increased size due to the increased size of the generating chamber is indicated in dotted lines in Fig. 10 at 193, and the motive fluid outlet leading therefrom at 194.

The action of the jets in this modified form of generating chamber is well illustrated diagrammatically in Figs. 12 and 13 and the action of each of the plurality of jets there shown is substantially the same as the action of the single jet illustrated in Fig. 11.

As shown in Fig. 13 approximately circular planes of impact are formed in the generating chamber, the sum of the areas of the planes of impact of the entire series of jets being less than the cross sectional area of the generating chamber at the location of said planes of impact; and the respective heat developing and heat-absorbing jets are so proportioned and adjusted as not to be in contact with the interior wall of the generating chamber or in contact with each other, the desirability and effect of keeping the products of combustion from commingling with the oncoming materials of the respective fuel jets being the same as in the case of the single jet generating chamber shown in Fig. 11.

The motive fluid resulting from the multiplicity of jets is forced back into the open passages of the generating chamber not occupied by the jets and, thence find their way through the discharge slot 193 and the discharge outlet 194, some portions of these gases however, passing directly to said slot.

While we have shown in this form of generating chamber all of the fuel jets at one end and all of the liquid jets at the other end, it is to be understood that we do not limit ourselves to jets so located as it would be entirely feasible to locate some of them in reverse order.

As already hereinbefore explained this form of generating chamber is designed for use in connection with high power plants and in situations where it may be desirable to cut down the power or pressure to suit varying conditions at different times. To answer this requirement one or more of the respective compound jets may be cut off or all operated together as may be desired.

What we claim is:

1. In an apparatus of the class described, the combination of a closed container and means for continuously burning hydrocarbon materials therein, means for subjecting the flaming gases to the action of fluid heat-absorbing materials therein to form a motive fluid, conducting means for leading the motive fluid from said container to a heat utilizing device, means in said conducting means for reducing the pressure of said motive fluid delivered to said device, means operated by a portion of said motive fluid at the higher pressure for supplying said hydrocarbon materials and said fluid heat-absorbing materials to said container at a pressure greater than the pressure of the gases in said container, and means for varying the temperature of the gases in said container without varying the pressure thereof.

2. In an apparatus of the class described, the combination of a closed container and means for continuously burning hydrocarbon materials therein, means for subjecting the flaming gases to the action of fluid heat-absorbing materials therein to form a motive fluid, conducting means for leading the motive fluid from said container to a heat utilizing device, means in said conducting means for reducing the pressure of said motive fluid delivered to said device, means operated by a portion of said motive fluid at the higher pressure for supplying said hydrocarbon materials and said fluid heat-absorbing materials to said container at a pressure greater than the pressure of the gases in said container, and means for varying the pressure of the gases in said container without varying the temperature thereof.

3. In an apparatus of the class described, the combination of a closed container and means for continuously burning hydrocarbon materials therein, means for subjecting the flaming gases to the action of fluid heat-absorbing materials therein to form a motive fluid, conducting means for leading the motive fluid from said container to a heat utilizing device, means in said conducting means for reducing the pressure of said motive fluid delivered to said device, means operated by a portion of said motive fluid at the higher pressure for supplying said hydrocarbon materials and said fluid heat-absorbing materials to said container at a pressure greater than the pressure of the gases in said container and means for varying either the temperature or pressure, or both the temperature and pressure, of the gases in said container.

4. In an apparatus of the class described, a generating chamber comprising a hollow body, means for admitting hydrocarbons at one side of said chamber to form a heat developing jet, means for admitting liquid at another side of said chamber to form a heat-absorbing jet, means for admitting oxygen-bearing fluid under pressure to said chamber to atomize and oxidize the materials of said jets, means for so projecting and proportioning said jets as to form a plane of impact therebetween, and means for discharging the gaseous fluid in said chamber without disturbing said plane of impact.

5. In an apparatus of the class described, a generating chamber comprising a hollow body provided with a plurality of chambered wall sections, injectors at opposite sides of said hollow body connected to a source of compressed air supply, means for supplying liquid to one of said wall sections and from it to one of said injectors means for supplying hydrocarbons to another of said injectors, and means for so proportioning and positioning the materials passing from said injectors as to form an approximately circular plane of impact in said generating chamber between the jets formed by said materials.

6. In an apparatus of the class described, a generating chamber comprising a hollow body provided with a plurality of chambered wall sections, one of said sections being provided with a heat insulating material, injectors at opposite sides of said hollow body connected to a source of compressed air supply, means for supplying heat-absorbing liquid to one of said wall sections and from it to one of said injectors, means for supplying hydrocarbons to another of said injectors, means for so proportioning and positioning the materials passing from said injectors as to form an approximately circular plane of impact in said generating chamber between the jets formed by said materials, and means for withdrawing from said chamber the gaseous fluid therein without disturbing said plane of impact, said means comprising a discharge chamber formed in said hollow body and a slotted longitudinally rounded take-off port leading thereto from the interior of said generating chamber.

7. In an apparatus of the class described a generating chamber comprising a hollow body provided with a plurality of chambered wall sections, one of said sections being provided with a heat insulating material, injectors at opposite sides of said hollow body connected to a source of compressed air supply, means for supplying liquid to one of said wall sections and from it to one of said injectors, means for supplying hydrocarbons to another of said injectors, means for so proportioning and positioning the materials passing from said injectors as to form an approximately circular plane of impact in said generating chamber between the jets formed by said materials, means for withdrawing from said chamber the gaseous fluid therein without disturbing said plane of impact, said means comprising a discharge chamber formed in said hollow body and a slotted longitudinally rounded take-off port leading thereto from the interior of said generating chamber, and means for relieving the pressure of the gases in said generating chamber when a predetermined pressure is reached.

8. In an apparatus of the class described the combination with a generating chamber of an injector for hydrocarbons, comprising an outer casing apertured to receive a pipe connection to a source of compressed air supply, a second hollow casing within the first named casing and spaced therefrom to form a scavenging air chamber and apertured to receive a pipe connection to a source of compressed air supply, the inner end of said second hollow casing being beveled to form a valve seat, a third hollow casing within and spaced from said second named casing to form an atomizing air chamber and aperture to receive a pipe connection to a source of hydrocarbon supply, a valve having a cone-shaped surface and means whereby said hydrocarbons may be transmitted to said cone surface.

9. In an apparatus of the class described the combination with a generating chamber of an injector for hydrocarbons, comprising an outer casing apertured to receive a pipe connection to a source of compressed air supply, a second hollow casing within the first named casing and spaced therefrom to form a scavenging air chamber and apertured to receive a pipe connection to a source of compressed air supply, the inner end of said second hollow casing being beveled to form a valve seat, a third hollow casing within and spaced from said second named casing to form an atomizing air chamber and apertured to receive a pipe connection to a source of hydrocarbon supply, a valve having a cone-shaped surface, means whereby said hydrocarbons may be transmitted to said cone surface, and an annular laterally adjustable choke-piece on said outer casing for deflecting and varying the deflection of the compressed air from said scavenging air chamber.

10. In an apparatus of the class described, the combination with a generating chamber of an injector for hydrocarbons, comprising an outer casing apertured to receive a pipe connection to a source of compressed air supply, a second hollow casing within the first named casing and spaced therefrom to form a scavenging air chamber and apertured to receive a pipe connection to a source of compressed air supply the inner end of said second hollow casing being beveled to form a valve seat, a third hollow casing within and spaced from said second named casing to form an atomizing air chamber and apertured to receive a pipe connection to a source of hydrocarbon supply, a valve comprising a cone-shaped fuel distributing surface and a longitudinally movable guide member therefor slotted for the passage of fuel therethrough.

11. In an apparatus of the class described, the combination with a generating chamber of an injector for hydrocarbons, comprising an outer casing apertured to receive a pipe connection to a source of compressed air supply, a second hollow casing within the first named casing and spaced therefrom to form a scavenging air chamber and apertured to receive a pipe connection to a source of compressed air supply the inner end of said second hollow casing being beveled to form a valve seat, a third hollow casing within and spaced from said second named casing to form an atomizing air chamber and apertured to receive a pipe connection to a source of hydrocarbon supply, a valve comprising a cone-shaped fuel distributing surface a guide therefor longitudinally movable within the third named casing longitudinally apertured for the passage of fuel therethrough and provided with an annular reduced portion to receive fuel passing through the apertures of said guide.

12. In an apparatus of the class described, the combination with a generating chamber of a blow-off valve comprising a valve casing secured to a wall of said chamber, a spring-closed valve therein and means for manually opening said valve against the action of said spring, said opening means comprising an operating lever and a cam head thereon adapted to bear against said valve casing.

13. In an apparatus of the class described, the combination with a generating chamber of unvarying dimensions, of means for admitting thereto under fluid pressure heat developing materials and heat absorbing materials, from opposite directions, the heat developing materials being in a state of combustion in said chamber and means for positioning said materials to form an approximately circular plane of impact less than the diameter of the generating chamber.

14. In an apparatus of the class described, the combination with a generating chamber of unvarying dimensions of means for admitting thereto under fluid pressure heat developing materials and heat-absorbing materials, from opposite directions, the heat developing materials being in a state of combustion in said chamber, means for positioning said materials to form an approximately circular plane of impact less than the diameter of the generating chamber and supplemental means for varying the position of the materials so positioned.

15. In an apparatus of the class described, the combination with a generating chamber of unvarying dimensions, of means for admitting thereto under fluid pressure, heat developing materials and heat-absorbing materials from opposite directions, the heat developing materials being in a state of combustion in said chamber, means for positioning said materials to form an approximately circular plane of impact less than the diameter of the generating chamber, and means for varying the temperature of the gases in said chamber without varying the pressure therein.

16. In an apparatus of the class described, the combination with a generating chamber of unvarying dimensions, of means for admitting thereto under fluid pressure heat developing materials and heat-absorbing materials, from opposite directions, the heat developing materials being in a state of combustion in said chamber, means for so positioning said materials to form an approximately circular plane of impact less than the diameter of the generating chamber, and means for varying the pressure of the gases in said chamber without varying the temperature of said gases.

17. In an apparatus of the class described, the combination with a generating chamber of unvarying dimensions, of means for admitting thereto under fluid pressure heat developing materials and heat absorbing materials, from opposite directions, the heat developing materials being in a state of combustion in said chamber, means for positioning said materials to form an approximately circular plane of impact less than the diameter of the generating chamber, and means for varying either the temperature or pressure, or both temperature and pressure, of the gases in said chamber.

18. In an apparatus of the class described, a generating chamber comprising a hollow body provided with a plurality of chambered wall sections, a plurality of hydrocarbon injectors at one side of said hollow body and connected to a source of compressed air supply, a plurality of injectors at the other side of said hollow body and connected to a source of compressed air supply, means for supplying liquid to one of said wall sections and from it to one or more of the injectors last named, and means for regulating or cutting off the passage of materials through one or more of said injectors.

19. In an apparatus of the class described, a generating chamber comprising a hollow body provided with a plurality of chambered wall sections, a plurality of hydrocarbon injectors at one side of said hollow body and connected to a source of compressed air supply, a plurality of injectors at the other side of said hollow body oppositely disposed respectively to the first named injectors and connected to a source of compressed air supply, means for supplying liquid to one of said wall sections and from it to one or more of the second named injectors, and means for so proportioning and positioning the materials passing from the respective oppositely disposed injectors as to form approximately circular planes of impact therebetween, spaced from each other and spaced from the walls of the generator.

20. In an apparatus of the class described, a generating chamber comprising a hollow body provided with a plurality of chambered wall sections, a plurality of hydrocarbon injectors at one side of said hollow body and connected to a source of compressed air supply, a plurality of injectors at the other side of said hollow body oppositely disposed respectively to the first named injectors and connected to a source of compressed air supply, means for supplying liquid to one of said wall sections and from it to one or more of the second named injectors, means for so proportioning and positioning the materials passing from the respective oppositely disposed injectors as to form approximately circular planes of impact therebetween spaced from each other and spaced from the walls of the generator, and means whereby the flow of materials from one of said injectors is independent of the flow of materials from another.

21. In an apparatus of the class described, a generating chamber comprising a hollow body provided with a plurality of chambered wall sections, a plurality of hydrocarbon injectors at one side of said hollow body and connected to a source of compressed air supply, a plurality of injectors at the other side of said hollow body oppositely disposed respectively to the first named injectors and connected to a source of compressed air supply, means for supplying liquid to one of said wall sections and from it to one or more of the second named injectors, means for so proportioning and positioning the materials passing from the respective oppositely disposed injectors as to form approximately circular planes of impact therebetween, spaced from each other and spaced from the walls of the generator, and means whereby the flow of materials from one pair of oppositely disposed injectors is independent of the flow of materials from another pair.

22. In an apparatus of the class described, a generating chamber comprising a hollow body provided with a plurality of chambered wall sections, a plurality of hydrocarbon injectors at one side of said hollow body and connected to a source of compressed air supply, a plurality of injectors at the other side of said hollow body oppositely disposed respectively to the first named injectors and connected to a source of compressed air supply, means for supplying liquid to one of said wall sections and from it to one or more of the second named injectors, means for so proportioning and positioning the materials, passing from the respective oppositely disposed injectors as to form approximately circular planes of impact therebetween, spaced from each other and spaced from the walls of the generator, and means for regulating or cutting off the passage of materials through one or more of said injectors.

23. In an apparatus of the class described, the combination of means for continuously burning hydrocarbon materials in a closed container, means for continuously subjecting the flaming gases to the action of fluid heat-absorbing materials therein to form a motive fluid, conducting means for leading the motive fluid from said container to a heat utilizing device, means in said conducting means for reducing the pressure of said motive fluid delivered to said device, compressing and pumping means operated by a portion of said motive fluid at the higher pressure for compressing and pumping said materials and means for delivering the exhaust motive fluid from said compressing and pumping means to said heat utilizing device.

24. In an apparatus of the class described, the combination of means for continuously burning hydrocarbon materials in a closed container, means for continuously subjecting the flaming gases to the action of fluid heat-absorbing materials therein to form a motive fluid, conducting means for leading the motive fluid to a heat utilizing device, means in said conducting means for reducing the pressure of said motive fluid delivered to said device, compressing and pumping means operated by a portion of said motive fluid at the higher pressure for compressing and pumping said materials, and means for supplying to said pumping means, condensed portions of the exhaust motive fluid to form one of said heat-absorbing materials.

25. In an apparatus of the class described, the combination of means for continuously burning hydrocarbon materials in a closed container, means for continuously subjecting the flaming gases to the action of fluid heat-absorbing materials therein to form a motive fluid, conducting means for leading the motive fluid to a heat utilizing device, means in said conducting means for reducing the pressure of said motive fluid delivered to said device, compressing and pumping means operated by a portion of said motive fluid at the higher pressure for compressing and pumping said materials, means for delivering the exhaust motive fluid from said compressing and pumping means to said heat utilizing device, and means for supplying to said pumping means, condensed portions of the exhaust motive fluid to form one of said heat-absorbing materials.

26. In an apparatus of the class described, the combination of means for continuously burning hydrocarbon materials in a closed container, means for continuously subjecting the flaming gases to the action of fluid heat-absorbing materials therein to form a motive fluid, conducting means for leading the motive fluid to a heat utilizing device, means in said conducting means for reducing the pressure of said motive fluid delivered to said device, compressing and pumping means operated by a portion of said motive fluid at the higher pressure for compressing and pumping said materials, means for delivering the exhaust motive fluid from said compressing and pumping means to said heat utilizing device, and means for condensing and supplying to said pumping means, condensable portions of the exhaust motive fluid to form one of said heat-absorbing materials.

27. In an apparatus for generating motive fluid, the combination with a generating chamber of fluid-pressure-operated means for supplying under pressure to said chamber finely divided hydrocarbons and oxygen-bearing fluid to form and feed a heat-developing jet in a state of combustion therein and finely divided liquid and oxygen-bearing fluid to form and feed a heat-absorbing jet therein, means for so projecting and positioning said jets as to form an approximately circular plane of impact therebetween less in diameter than the diameter of said chamber at the point of impact, whereby the resultant gases are cooled and commingled to form a motive fluid, conducting means for leading the motive fluid from said chamber to a heat utilizing device, means for reducing the pressure of said fluid before reaching said device, and means whereby a portion of said fluid at the higher pressure is by-passed to operate said fluid-pressure-operated means.

28. In an apparatus for generating motive fluid, the combination with a generating chamber of fluid-pressure-operated means for supplying under pressure to said chamber finely divided hydrocarbons and oxygen-bearing fluid to form and feed a heat developing jet in a state of combustion therein and finely divided liquid and oxygen-bearing fluid to form and feed a heat-absorbing jet therein, means for so projecting and positioning said jets as to form an approximately circular plane of impact therebetween, less in diameter than the diameter of said chamber at the point of impact, whereby the resultant gases are cooled and commingled to form the motive fluid, conducting means for leading the motive fluid from said chamber to a heat utilizing device, pressure reducing means interposed in said conducting means between said chamber and said device for reducing the pressure of the fluid delivered thereto, and conducting means interposed between said pressure reducing means and said chamber whereby a portion of said fluid is led from the high pressure side of said pressure reducing means to operate said fluid-pressure-operated means.

29. In an apparatus for generating motive fluid, the combination with a generating chamber of fluid-pressure-operated means for supplying under pressure to said chamber finely divided hydrocarbons and oxygen-bearing fluid to form and feed a heat-developing jet in a state of combustion therein and finely divided liquid and oxygen-bearing fluid to form and feed a heat-absorbing jet therein, means for so projecting and positioning said jets as to form an approximately circular plane of impact therebetween less in diameter than the diameter of said chamber at the point of impact, whereby the resultant gases are cooled and commingled to form the motive fluid, conducting means for leading the motive fluid from said chamber to a heat utilizing device, pressure reducing means interposed in said conducting means between said chamber and said device, for reducing the pressure of the fluid delivered thereto, conducting means interposed between said pressure reducing means and said chamber, whereby a portion of said fluid is led from the high pressure side of said pressure-reducing means to operate said fluid-pressure-operated means, and means for conducting the exhaust motive fluid from said last named means to said heat utilizing device.

30. In an apparatus for generating motive fluid, the combination with a generating chamber of fluid-pressure-operated means for supplying under pressure to said chamber finely divided hydrocarbons and oxygen-bearing fluid to form and feed a heat-developing jet in a state of combustion therein and finely divided liquid and oxygen-bearing fluid to form and feed a heat-absorbing jet therein, means for so projecting and positioning said jets as to form an approximately circular plane of impact therebetween less in diameter than the diameter of said chamber at the point of impact, whereby the resultant gases are cooled and commingled to form the motive fluid, conducting means for leading the motive fluid from said chamber to a heat utilizing device, pressure reducing means interposed in said conducting means between said chamber and said device, for reducing the pressure of the fluid delivered thereto, conducting means interposed between said pressure reducing means and said chamber, whereby a portion of said fluid is led from the high pressure side of said pressure reducing means to operate said fluid-pressure-operated means, means for conducting the exhaust motive fluid from said last named means to said heat utilizing device and means for condensing the condensable portions of the motive fluid thus utilized, to be supplied by the first named means to the heat-absorbing jet.

31. In an apparatus for generating motive fluid, the combination with a generating chamber of fluid-pressure-operated means for supplying under pressure to said chamber finely divided hydrocarbons and oxygen-bearing fluid to form and feed a heat-developing jet in a state of combustion therein and finely divided liquid and oxygen-bearing fluid to form and feed a heat-absorbing jet therein, means for so projecting and positioning said jets as to form an approximately circular plane of impact therebetween less in diameter than the diameter of said chamber at the point of impact, whereby the resultant gases are cooled and commingled to form the motive fluid, conducting means for leading the motive fluid from said chamber to a heat utilizing device, pressure reducing means interposed in said conducting means between said chamber and said device, for reducing the pressure of the fluid delivered thereto, conducting means interposed between said pressure reducing means and said chamber, whereby a portion of said fluid is led from the high pressure side of said pressure reducing means to operate said fluid-pressure-operated means, means for conducting the exhaust motive fluid from said last named means to said heat utilizing device, means for condensing the condensable portions of the motive fluid thus utilized to be supplied by the first named means to the heat-absorbing jet and means for utilizing a portion of the heat of combustion from the generating chamber for heating said condensed portions before injection into the generating chamber to form part of the heat-absorbing jet.

32. In an apparatus of the class described, the combination with a closed generating chamber provided with oppositely disposed inlets, of fluid-pressure-operated means for supplying hydrocarbons and compressed air to one of said inlets to form a heat developing jet, and liquid and compressed air to the other of said inlets to form a heat-absorbing jet, said fluid-pressure-operated means including air compressing means and pumping means, means for proportioning and positioning said jets to form jet cones having an approximately circular and uniform plane of impact, whereby the gases of combustion are cooled and commingled with the heat-absorbing material to form a motive fluid, means for drawing off the motive fluid thus formed without impeding the materials of the jets or disturbing the jet cones, conducting means for leading the motive fluid to a heat utilizing device, pressure reducing means interposed between said device and said generating chamber, conducting means interposed between said pressure reducing means and said chamber, whereby a portion of the motive fluid at the generator pressure is utilized to actuate said fluid-pressure-operated means, means for conducting the exhaust motive fluid from said fluid-pressure-operated means to said heat utilizing device, means for condensing the condensable portions of the exhaust motive fluid from said device, and means whereby said condensed portions of the motive fluid are utilized to absorb heat of compression in said air compressor for transmission to both jets and radiant heat of combustion from the generating chamber to heat the heat absorbing jet.

EDWIN TAYLOR.
WILLIAM H. TAYLOR.

Witnesses:
SADIE R. SEMLEAR,
EUGENE S. MACDONALD.